United States Patent
Zhu et al.

(10) Patent No.: US 12,369,080 B2
(45) Date of Patent: Jul. 22, 2025

(54) COMMUNICATION METHOD AND APPARATUS

(71) Applicant: HUAWEI TECHNOLOGIES CO., LTD., Shenzhen (CN)

(72) Inventors: Yuanping Zhu, Shanghai (CN); Yibin Zhuo, Shenzhen (CN); Jing Liu, Shanghai (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 457 days.

(21) Appl. No.: 17/871,364

(22) Filed: Jul. 22, 2022

(65) Prior Publication Data
US 2022/0361072 A1 Nov. 10, 2022

Related U.S. Application Data

(63) Continuation of application No. PCT/CN2020/074032, filed on Jan. 23, 2020.

(51) Int. Cl.
*H04W 36/00* (2009.01)
*H04W 36/08* (2009.01)
(Continued)

(52) U.S. Cl.
CPC ..... *H04W 36/0061* (2013.01); *H04W 36/087* (2023.05); *H04W 88/08* (2013.01); *H04W 92/24* (2013.01)

(58) Field of Classification Search
CPC ........... H04W 36/0061; H04W 36/087; H04W 88/08; H04W 92/24
See application file for complete search history.

(56) References Cited

U.S. PATENT DOCUMENTS

2011/0286429 A1* 11/2011 Vikberg ............ H04W 36/0005 370/331
2019/0254090 A1 8/2019 Yang et al.

FOREIGN PATENT DOCUMENTS

| CN | 110351700 A | 10/2019 |
| CN | 110536350 A | 12/2019 |

(Continued)

OTHER PUBLICATIONS

Samsung, IP address management during the IAB migration. 3GPP TSG-RAN WG3 Meeting #105bis, Chongqing, China, Oct. 14-18, 2019, R3-195001, 5 pages.

(Continued)

*Primary Examiner* — Natasha W Cosme
(74) *Attorney, Agent, or Firm* — HAUPTMAN HAM, LLP

(57) ABSTRACT

A communication method includes a first IAB node receives a first message from a CU of an IAB donor, where the first message indicates the first IAB node to be handed over from a first parent node to a second parent node, and the first message includes a first IP address of the first IAB node. The first IAB node determines first transport network layer association information between the first IAB node and the CU of the IAB donor based on the first IP address. The first IAB node updates control plane context information of an F1 interface by using the first transport network layer association information, where the F1 interface is an interface between the first IAB node and CU of the IAB donor. An IAB node communicates with a CU of an IAB donor by using a first IP address as soon as possible after handover is completed.

15 Claims, 18 Drawing Sheets

(51) Int. Cl.
  *H04W 88/08*  (2009.01)
  *H04W 92/24*  (2009.01)

(56) References Cited

FOREIGN PATENT DOCUMENTS

| CN | 110649997 A | 1/2020 |
|---|---|---|
| RU | 2335097 C2 | 9/2008 |
| WO | 2018236867 A2 | 12/2018 |
| WO | 2019246446 A1 | 12/2019 |
| WO | 2020001146 A1 | 1/2020 |

OTHER PUBLICATIONS

Samsung, IP address management during the IAB migration. 3GPP TSG-RAN WG3 Meeting #105, Ljubljana, SI, Aug. 26-30, 2019, R3-193985, 6 pages.
3GPP TS 38.401 V16.0.0 (Dec. 2019), 3rd Generation Partnership Project; Technical Specification Group Radio Access Network; NG-RAN; Architecture description(Release 16), 49 pages.
R. Stewart et al., Stream Control Transmission Protocol (SCTP) Dynamic Address Reconfiguration. RFC5061, Sep. 2007, 41 pages.
ZTE, Sanechips, Discussion on inter-CU IAB migration handling. 3GPP TSG RAN WG3 Meeting #105, Ljubljana, Slovenija, Aug. 26-30, 2019, R3-193655, 4 pages.
3GPP TS 38.473 V16.0.0 (Dec. 2019), 3rd Generation Partnership Project; Technical Specification Group Radio Access Network; NG-RAN; F1 application protocol (F1AP)(Release 16), 239 pages.
R. Stewart, Stream Control Transmission Protocol. RFC4960, Sep. 2007, 152 pages.
LG Electronics Inc., Inter-donor topology adaptation for architecture 1a. 3GPP TSG-RAN WG3 #102, Spokane, WA, USA, Nov. 12-16, 2018, R3-186751, 7 pages.
3GPP TS 38.463 V16.0.0 (Dec. 2019), 3rd Generation Partnership Project; Technical Specification Group Radio Access Network; NG-RAN; E1 Application Protocol (E1AP)(Release 16), 190 pages.
M. Tuexen et al., Authenticated Chunks for the Stream Control Transmission Protocol (SCTP). RFC4895, Aug. 2007, 19 pages.
Qualcomm Incorporated, Nokia, Samsung, Huawei, LG, Ericsson, CATT, KDDI, (TP for NR_IAB BL CR to TS 38.401) Intra-CU topology adaptation procedure. 3GPP TSG-RAN WG3 Meeting #105bis, Chongqing, China, Oct. 14-18, 2019, R3-196171, 3 pages.
3GPP TS 38.425 V15.6.0 (Jul. 2019), 3rd Generation Partnership Project; Technical Specification Group Radio Access Network; NG-RAN; NR user plane protocol(Release 15), 22 pages.
3GPP TS 38.472 V15.6.0 (Dec. 2019), 3rd Generation Partnership Project; Technical Specification Group Radio Access Network; NG-RAN; F1 signalling transport(Release 15), 9 pages.
International Search Report issued in corresponding International Application No. PCT/CN2020/074032, dated Sep. 27, 2020, pp. 1-9.
Qualcomm Incorporated, Core network impacts of integrated access and backhaul (IAB) . 3GPP TSG-CT WG1 Meeting #119, Wroclaw, Poland; Aug. 26-30, 2019, C1-194418, 7 pages.
Huawei, (TP for NR_IAB BL CR for TS 38.401): Rethinking about the IAB topology discovery. 3GPP TSG-WG3 Meeting #106, Reno, Nv, USA, Nov. 18-22, 2019, R3-196979, 5 pages.
Japanese Office Action issued in corresponding Japanese Patent Application No. 2022-544858, mailed Jul. 18, 2023, pp. 1-10.
Chinese Office Action issued in corresponding Chinese Application No. 202080094357.4, dated May 23, 2024, pp. 1-44.
Qualcomm Incorporated, Remaining IP transport issues for IAB. 3GPP TSG-RAN WG3 Meeting #107-e, Electronic Meeting, Feb. 24-Mar. 6, 2020, R3-200417, 3 pages.
Huawei, IP address Update when IAB topology change. 3GPP TSG-RAN WG3 meeting #107bis-e, E-meeting, Apr. 20-30, 2020, R3-202091, 23 pages.
Japanese Office Action issued in corresponding Japanese Application No. 2022-544858, dated Dec. 26, 2023, pp. 1-12.
Russian Office Action issued in corresponding Russian Application No. 2022121851/07(046367), mailed Apr. 25, 2023, pp. 1-16.
3GPP TSG RAN WG3 Meeting, R3-196690, Discussion on network-controlled IAB migration handling; ZTE, Sanechips, Nov. 18-22, 2019, total 5 pages.
3GPP TSG-RAN WG3 Meeting, R3-192609, Further discussion on intra-donor transport scheme, Samsung, May 13-May 17, 2019, total 4 pages.
3GPP TSG-RAN WG3 Meeting , R3-193979, Further discussion on IP address issues of IAB network, Samsung, 13.2.1.3 (IP Address Management), Ljubljana, SI, Aug. 26-30, 2019, total 7 pages.
Korean Office Action issued in corresponding Korean Application No. 10-2022-7028997, dated May 17, 2024, pp. 1-15.
Huawei: "BL CR to 38.401 Support for IAB", 3GPP Draft; R3-196306, Nov. 3, 2019, XP051814882, total 13 pages.
Huawei: "BL CR to 38.401 Support for IAB", 3GPP Draft; R3-196306 BL CR To 38.401, Nov. 3, 2019, KP051812997, total 13 pages.
Extended European Search Report issued in corresponding European Application No. 20915738.7, dated Dec. 3, 2022, pp. 1-6.

\* cited by examiner

COMMUNICATION METHOD AND APPARATUS

CROSS-REFERENCE TO RELATED APPLICATIONS

This application is a continuation of International Application No. PCT/CN2020/074032, filed on Jan. 23, 2020, the disclosure of which is hereby incorporated in entirety by reference.

BACKGROUND

An integrated access and backhaul (integrated access and backhaul, IAB) network technology is introduced into a 5th generation (5th generation, 5G) mobile communication system. A wireless transmission solution is used for both an access link (access link) and a backhaul link (backhaul link) in an IAB network, to avoid optical fiber deployment, thereby reducing deployment costs and improving deployment flexibility. In the IAB network, an IAB donor gNodeB (IAB donor gNodeB, IAB DgNB) is connected to a core network (for example, a core network (5G core, 5GC) in a 5G system) through a wired link, and then an integrated access and backhaul node (integrated access and backhaul node, IAB node) is added between the IAB donor gNodeB and a terminal. A radio access service is provided for the terminal through an access link (access link, AL) of the IAB node, and the IAB node is connected to the IAB donor gNodeB through a backhaul link (backhaul link, BL) of the IAB node, to transmit service data of the terminal.

Currently, when topology update occurs on an IAB network, if an IAB donor gNodeB connected to an IAB node changes, an F1 interface is to be reestablished. Because the F1 interface is to be reestablished, a control plane/user plane context of the F1 interface needs to be regenerated. This greatly affects a service latency of a terminal and causes enormous signaling overheads.

SUMMARY

In some embodiments, a communication method and apparatus are provided to resolve a problem that F1 interface reestablishment causes a great service latency and enormous signaling overheads.

According to a first aspect, a communication method. The method is applicable to a scenario in which a first IAB node is handed over, in a service range of a CU of a same IAB donor, from a first DU of the IAB donor to a second DU of the IAB donor. The method includes A first IAB node receives a first message from a CU of an IAB donor, where the first message indicates the first IAB node to be handed over from a first parent node to a second parent node. The first parent node is a first DU of the IAB donor, or the first parent node is connected to the CU of the IAB donor through a first DU of the IAB donor. The second parent node is a second DU of the IAB donor, or the second parent node is connected to the CU of the IAB donor through a second DU of the IAB donor. The first message includes a first IP address allocated to the first IAB node. The first IAB node determines, based on the first IP address, first transport network layer association information between the first IAB node and the CU of the IAB donor after the first IAB node is handed over to the second parent node. The first IAB node updates control plane context information of a first interface based on the first transport network layer association information, where the first interface is an F1 interface between the first IAB node and the CU of the IAB donor.

In this embodiment, when a parent node of the first IAB node is changed due to IAB topology update, the first IAB node obtains the first IP address, and updates the control plane context between the IAB node and the IAB donor based on the first IP address, to avoid a service latency and signaling overheads caused by F1 interface reestablishment. After the handover is completed, the IAB node performs F1 interface communication with the CU of the IAB donor by using the first IP address. In this way, the IAB node communicates with the CU of the IAB donor by using the first IP address as soon as possible after the handover is completed, thereby reducing impact on a service latency of a terminal device served by the IAB node.

In a possible design, the first IAB node receives, through the first parent node, indication information from the CU of the IAB donor. Alternatively, the indication information is included in the first message. The first IAB node determines, based on the indication information, the first transport network layer association information after the first IAB node is handed over to the second DU of the IAB donor.

In this way, the IAB node updates an F1 interface TNL association as soon as possible after the handover is completed, to restore, as soon as possible, a capability of providing a service for the terminal device, and reduce the impact on the service latency of the terminal device.

In a possible design, the first IAB node generates the first transport network layer association information by using the first IP address.

Alternatively, the first IAB node obtains the first transport network layer association information by adding the first IP address to second transport network layer association information, where the second transport network layer association information is transport network layer association information between the first IAB node and the CU of the IAB donor before the first IAB node is handed over to the second parent node.

In a possible design, the first message further includes an IP address of the CU of the IAB donor, and the IP address of the CU of the IAB donor is used by the IAB node to perform control plane communication with the CU of the IAB donor, and/or the IP address of the CU of the IAB donor is used by the IAB node to determine the first transport network layer association information between the first IAB node and the CU of the IAB donor.

In this way, the IAB node communicates with the CU of the IAB donor by using the IP address as soon as possible after the handover is completed, thereby reducing the impact, caused by the handover of the IAB node, on the service latency of the terminal device served by the IAB node.

According to a second aspect, an embodiment provides a communication method. The method is applicable to a scenario in which a first IAB node is handed over from a DU of a first IAB donor to a DU of a second IAB donor, that is, the first IAB node is connected to different IAB donors before and after the handover. The method includes: A first IAB node receives a first message from a CU of a first IAB donor, where the first message indicates the first IAB node to be handed over from a first parent node to a second parent node. The first parent node is a DU of the first IAB node, or the second parent node is connected to the CU of the first IAB donor through a DU of the first IAB donor. The second parent node is a DU of a second IAB donor, or the second parent node is connected to a CU of a second IAB donor through a DU of the second IAB donor. The first message includes an IP address of the first IAB node. After the first IAB node is handed over to the second parent node, the first IAB node determines, based on the first IP address, first transport network layer association information between the first IAB node and the CU of the second IAB donor after the first IAB node is handed over to the second parent node. The first IAB node updates control plane context information of a first interface by using the first transport network layer association information, where the first interface is an F1 interface between the first IAB node and the second IAB donor.

In this embodiment, when a parent node of the first IAB node is changed due to IAB topology update, the first IAB node obtains the first IP address, and updates the control plane context between the IAB node and the IAB donor based on the first IP address, to avoid a service latency and signaling overheads caused by F1 interface reestablishment.

In a possible design, the first IAB node receives, through the first parent node, indication information from the CU of the first IAB donor. Alternatively, the indication information is included in the first message. The first IAB node determines, based on the indication information, the first transport network layer association information after the first IAB node is handed over to the second DU of the IAB donor.

In this way, the IAB node updates an F1 interface TNL association as soon as possible after the handover is completed, to restore, as soon as possible, a capability of providing a service for a terminal device, and reduce impact on a service latency of the terminal device.

In a possible design, the first IAB node generates, by using the first IP address, the first transport network layer association information between the first IAB node and the CU of the second IAB donor.

In this way, the IAB node communicates with the CU of the IAB donor by using the first IP address as soon as possible after the handover is completed, thereby reducing the impact, caused by the handover of the IAB node, on the service latency of the terminal device served by the IAB node.

In a possible design, the first message further includes an IP address of the CU of the second IAB donor, and the IP address of the CU of the second IAB donor is used by the first IAB node to perform control plane communication with the CU of the second IAB donor, and/or the IP address of the CU of the IAB donor is used by the first IAB node to determine the first transport network layer association information between the first IAB node and the CU of the IAB donor.

In this way, the IAB node communicates with the CU of the IAB donor by using the first IP address as soon as possible after the handover is completed, thereby reducing the impact, caused by the handover of the IAB node, on the service latency of the terminal device served by the IAB node.

According to a third aspect, a communication method. The method is applicable to a scenario in which a first IAB node is handed over, in a service range of a CU of a same IAB donor, from a first DU of the IAB donor to a second DU of the IAB donor. The method includes: A CU of an IAB donor sends a first message to a first IAB node, where the first message indicates the first IAB node to be handed over from a first parent node to a second parent node. The first parent node is a first DU of the IAB donor, or the first parent node is connected to the CU of the IAB donor through a first DU of the IAB donor. The second parent node is a second DU of the IAB donor, or the second parent node is connected to the CU of the IAB donor through a second DU of the IAB donor. The first message includes a first IP address of the first IAB node.

The CU of the IAB donor determines, based on the first IP address, first transport network layer association information between the first IAB node and the CU of the IAB donor after the first IAB node is handed over to the second parent node. The CU of the IAB donor updates control plane context information of a first interface based on the first transport network layer association information, where the first interface is an F1 interface between the first IAB node and the IAB donor.

In a possible design, the CU of the IAB donor sends a fourth message to the first IAB node, where the fourth message includes indication information, or a third message includes the indication information. The indication information indicates that an occasion for the first IAB node to determine the first transport network layer association information is after the first IAB node is handed over to the second parent node.

In this way, the IAB node updates an F1 interface TNL association as soon as possible after the handover is completed, to restore, as soon as possible, a capability of providing a service for a terminal device, and reduce impact on a service latency of the terminal device.

In a possible design, the CU of the IAB donor establishes, by using the first IP address, the first transport network layer association information between the first IAB node and the CU of the IAB donor. Alternatively, the CU of the IAB donor obtains the first transport network layer association information by adding the first IP address to second transport network layer association information, where the second transport network layer association information is transport network layer association information between the first IAB node and the CU of the IAB donor before the first IAB node is handed over to the second parent node.

In this way, the CU of the IAB donor updates TNL association information in the CU of the IAB donor, to avoid introduction of a large quantity of context update signaling due to the handover of the IAB node and avoid the impact on the service latency of UE.

In a possible design, the first message further includes an IP address of the CU of the IAB donor, and the IP address of the CU of the IAB donor is used by the first IAB node to perform control plane communication with the CU of the IAB donor, and/or the IP address of the CU of the IAB donor is used by the first IAB node to determine the first transport network layer association information between the first IAB node and the CU of the IAB donor.

In this way, the IAB node communicates with the CU of the IAB donor by using the first IP address as soon as possible after the handover is completed, thereby reducing the impact, caused by the handover of the IAB node, on the service latency of the terminal device served by the IAB node.

In a possible design, the first IP address is obtained from an IP address pool of the CU of the IAB donor, or is obtained from the second DU of the IAB donor, or is obtained from an operation, administration, and maintenance OAM entity, or is obtained from a DHCP server.

According to a fourth aspect, an embodiment provides a communication method. The method is applicable to a scenario in which a first IAB node is handed over from a DU of a first IAB donor to a DU of a second IAB donor, that is, the first IAB node is connected to different IAB donors before and after the handover. The method includes: A CU of a first IAB donor sends a first message to a CU of a second IAB donor, where the first message includes an identifier of a first IAB node, and the first message is for requesting a first IP address. The CU of the first IAB donor receives a second message from the CU of the second IAB donor, where the second message includes the first IP address allocated to the first IAB node. The CU of the first IAB donor sends a third message to the first IAB node, where the third message indicates the first IAB node to be handed over from a first parent node to a second parent node. The first parent node is a DU of the first IAB donor, or the first parent node is connected to the CU of the first IAB donor through a DU of the first IAB donor. The second parent node is a DU of the second IAB donor, or the second parent node is connected to the CU of the second IAB donor through a DU of the second IAB donor. The third message includes the first IP address of the first IAB node.

In this embodiment of this application, when a parent node of the first IAB node is changed due to IAB topology update, the first IAB node obtains the first IP address, and updates the control plane context between the IAB node and the IAB donor based on the first IP address, to avoid a service latency and signaling overheads caused by F1 interface reestablishment. After the handover is completed, the IAB node performs F1 interface communication with the CU of the IAB donor by obtaining the first IP address. In this way, the IAB node communicates with the CU of the IAB donor by using the first IP address as soon as possible after the handover is completed, thereby reducing impact on a service latency of a terminal device served by the IAB node.

In a possible embodiment, the first message is a handover request message.

In another possible embodiment, the first message further includes user plane context information and/or control plane context information of a first interface between the first IAB node and the CU of the first IAB donor. The first interface is an F1 interface between the first IAB node and the second IAB donor.

In a possible embodiment, a CU of a first IAB donor sends fourth information to a first IAB node, where the fourth information includes a first IP address of the first IAB node, and the fourth message indicates the first IAB node to be handed over from a first parent node to a second parent node.

The first parent node is a DU of the first IAB donor, or the first parent node is a second IAB node connected to the CU of the first IAB donor through a DU of the first IAB donor. The second parent node is a DU of a second IAB donor, or the second parent node is a third IAB node connected to a CU of a second IAB donor through a DU of the second IAB donor.

In a possible embodiment, the CU of the first IAB donor sends a message including indication information to the first IAB node. Alternatively, the third message includes the indication information. The indication information indicates that an occasion for the first IAB node to determine first transport network layer association information is after the first IAB node is handed over to the DU of the second IAB donor.

In this way, the IAB node updates an F1 interface TNL association as soon as possible after the handover is completed, to restore, as soon as possible, a capability of providing a service for the terminal device, and reduce the impact on the service latency of the terminal device.

According to a fifth aspect, an embodiment provides a communication method. The method is applicable to a scenario in which a first IAB node is handed over from a DU of a first IAB donor to a DU of a second IAB donor, that is, the first IAB node is connected to different IAB donors before and after the handover. The method includes: A CU of a second IAB donor receives a first message from a CU of a first IAB donor, where the first message includes an identifier of a first IAB node, and the first message is for requesting a first internet protocol IP address. The CU of the second IAB donor sends a second message to the CU of the first IAB donor, where the second message includes a first IP address allocated to the first IAB node. The CU of the second IAB donor determines, based on the first IP address, first transport network layer association information between the first IAB node and the CU of the second IAB donor after the first IAB node is handed over to a second parent node. The CU of the second IAB donor updates control plane context information of a first interface based on the first transport network layer association information, where the first interface is an interface between the first IAB node and the CU of the second IAB donor.

In this embodiment, when a parent node of the first IAB node is changed due to IAB topology update, the first IAB node obtains the first IP address, and updates the control plane context between the IAB node and the IAB donor based on the first IP address, to avoid a service latency and signaling overheads caused by F1 interface reestablishment.

In a possible embodiment, the CU of the second IAB donor generates, by using the first IP address, the first transport network layer association information between the first IAB node and the CU of the second IAB donor.

In this way, the IAB node updates an F1 interface TNL association as soon as possible after the handover is completed, to restore, as soon as possible, a capability of providing a service for a terminal device, and reduce impact on the service latency of the terminal device.

In a possible embodiment, the first message is a handover request message.

In a possible embodiment, the first message further includes user plane context information and/or control plane context information of the first interface between the first IAB node and the CU of the first IAB donor. The first interface is an F1 interface between the first IAB node and the second IAB donor.

In a possible embodiment, the CU of the second IAB donor determines control plane context information corresponding to the identifier of the first IAB node. The CU of the second IAB donor replaces second transport network layer association information in the control plane context information with the first transport network layer association information, where the second transport network layer association information is transport network layer association information between the first IAB node and the CU of the IAB donor before the first IAB node is handed over to the second parent node.

In this case, in a scenario in which an IAB node is handed over between nodes of different IAB donors, F1 interface contexts of some or all IAB nodes are obtained in advance, thereby avoiding a large quantity of signaling for reestablishing an F1 interface and corresponding control plane and user plane contexts after the handover, and avoiding the impact on the service latency of a terminal.

In a possible embodiment, the first IP address is obtained from an IP address pool of the CU of the second IAB donor, or is obtained from a DU function entity of the second IAB donor, or is obtained by the CU of the second IAB donor from an operation, administration, and maintenance OAM entity, or is obtained by the CU of the second IAB donor from a DHCP server.

According to a sixth aspect, this application provides a communication method. The method is applicable to a scenario in which a first IAB node is handed over, in a service range of a CU of a same IAB donor, from a first DU of the IAB donor to a second DU of the IAB donor. The method includes: A CU of an IAB donor receives a control plane message from a first IAB node, where the control plane message includes a first IP address and a second IP address. The first IP address is an IP address of the first IAB node that is used when the first IAB node communicates with the CU of the IAB donor through a first parent node. The second IP address is an IP address of the first IAB node that is used when the first IAB node communicates with the CU of the IAB donor through a second parent node. The first parent node is a first DU of the IAB donor, or the first parent node is connected to the CU of the IAB donor through a first DU of the IAB donor. The second parent node is a second DU of the IAB donor, or the second parent node is connected to the CU of the IAB donor through a second DU of the IAB donor. The CU of the IAB donor replaces the first IP address in user plane downlink tunnel endpoint information of a first interface with the second IP address.

In this embodiment, according to the method, the CU of the IAB donor replaces, in batches, downlink tunnel information in an F1-U context based on the control plane message, to update a user plane context of a terminal device, and avoid a service latency and signaling overheads caused by F1 interface reestablishment.

According to a seventh aspect, this application provides a communication method. The method is applicable to a scenario in which a first IAB node is handed over, in a service range of a CU of a same IAB donor, from a first DU of the IAB donor to a second DU of the IAB donor. The method includes: A first IAB node receives a control plane message from a CU of an IAB donor, where the control plane message includes a first IP address and a second IP address. The first IP address is an IP address of the CU of the IAB donor that is used when the first IAB node communicates with the CU of the IAB donor through a first parent node. The second IP address is an IP address of the CU of the IAB donor that is used when the first IAB node communicates with the CU of the IAB donor through a second parent node. The first parent node is a first DU of the IAB donor, or the first parent node is connected to the CU of the IAB donor through a first DU of the IAB donor. The second parent node is a second DU of the IAB donor, or the second parent node is connected to the CU of the IAB donor through a second DU of the IAB donor. After the first IAB node is handed over from the first parent node to the second parent node, the first IAB node replaces the first IP address in user plane uplink tunnel endpoint information of an F1 interface with the second IP address.

In this embodiment, according to the method, the IAB node replaces, in batches, downlink tunnel information in an F1-U context based on the signaling, to update a user plane context of a terminal device, and avoid a service latency and signaling overheads caused by F1 interface reestablishment.

According to an eighth aspect, this application provides a communication method. The method is applicable to a scenario in which a first IAB node is handed over, in a service range of a CU of a same IAB donor, from a first DU of the IAB donor to a second DU of the IAB donor. The method includes: A CU-UP of an IAB donor receives a control plane message from a CU-CP of the IAB donor, where the control plane message includes a first IP address and a second IP address. The first IP address is an IP address of a first IAB node that is used when the first IAB node communicates with the CU-UP of the IAB donor through a first parent node. The second IP address is an IP address of the first IAB node that is used when the first IAB node communicates with the CU-UP of the IAB donor through a second parent node. The first parent node is a first DU of the IAB donor, or the first parent node is connected to the CU-UP of the IAB donor through a first DU of the IAB donor. The second parent node is a second DU of the IAB donor, or the second parent node is connected to the CU-UP of the IAB donor through a second DU of the IAB donor. The CU-UP of the IAB donor replaces the first IP address in user plane downlink tunnel endpoint information of an F1 interface with the second IP address.

In this embodiment, the IAB donor CU-UP replaces, in batches, downlink tunnel information in an F1-U context based on the control plane message, to update the F1-U context of a terminal device, and avoid a large quantity of signaling overheads for updating in a conventional technology.

According to a ninth aspect, this application provides a communication method. The method includes: A relay node receives a first message from a CU of a donor node through a first DU of the donor node, where the first message includes an IP address of the relay node. The relay node determines, based on the IP address, transport network layer association information between the relay node and the CU when the relay node is connected to the CU through a second DU of the donor node. The relay node updates control plane context information of a first interface based on the transport network layer association information, where the first interface is an interface between the relay node and the CU, the first DU is a source DU during relay node handover, and the second DU is a target DU during relay node handover.

In this embodiment, when a parent node of a first IAB node is changed due to IAB topology update, the first IAB node obtains a first IP address, and updates a control plane context between an IAB node and an IAB donor based on the first IP address, to avoid a service latency and signaling overheads caused by F1 interface reestablishment. After the handover is completed, the IAB node performs F1 interface communication with a CU of the IAB donor by using the first IP address. In this way, the IAB node communicates with the CU of the IAB donor by using the first IP address as soon as possible after the handover is completed, thereby reducing impact on the service latency of a terminal device served by the IAB node.

According to a tenth aspect, this application provides a communication method. The method includes: A relay node receives a first message from a target donor node through a source donor node, where the first message includes an IP address of the relay node. The relay node determines transport network layer association information between the relay node and the target donor node based on the IP address. The relay node updates control plane context information of a first interface based on the transport network layer association information. The first interface is an interface between the relay node and the target donor node, the source donor node is a source donor node during relay node handover, and a target donor node is a target donor node during relay node handover.

In this embodiment, the source donor node includes a CU of a donor, and optionally, alternatively includes a DU of a donor. When a parent node of a first IAB node is changed due to IAB topology update, the first IAB node obtains a first IP address, and updates a control plane context between an IAB node and an IAB donor based on the first IP address, to avoid a service latency and signaling overheads caused by F1 interface reestablishment.

According to an eleventh aspect, this application provides a communication apparatus. The communication apparatus is a first IAB node or a chip disposed inside a first IAB node. The communication apparatus has a function of implementing the first aspect. For example, the communication apparatus includes a corresponding module, unit, or means (means) for performing the steps in the first aspect. The function, the unit, or the means are implemented by software or hardware, or is implemented by hardware executing corresponding software.

In a possible design, the communication apparatus includes a processing unit and a communication unit. The communication unit is configured to receive and send a signal, to implement communication between the communication apparatus and another apparatus. For example, the communication unit is configured to receive first information from a network device. The processing unit is configured to perform some internal operations of the communication apparatus. Functions performed by the processing unit and the communication unit corresponds to the steps performed by the first IAB node in the foregoing aspects.

In a possible design, the communication apparatus includes a processor, and further includes a transceiver. The transceiver is configured to receive and send a signal, and the processor executes program instructions, to complete the method according to any one of the possible designs or implementations of the first aspect. The communication apparatus further includes one or more memories. The memory is configured to be coupled to the processor. The one or more memories are integrated with the processor, or is disposed independent of the processor. This is not limited in this application. The memory stores a computer program or instructions for implementing the functions in the first aspect. The processor executes the computer program or the instructions stored in the memory. When the computer program or the instructions is/are executed, the communication apparatus is enabled to implement the method according to any one of the possible designs or implementations of the first IAB node in the foregoing aspects.

In a possible design, the communication apparatus includes a processor and a memory. The memory stores a computer program or instructions for implementing the functions in the first aspect. The processor executes the computer program or the instructions stored in the memory. When the computer program or the instructions is/are executed, the communication apparatus is enabled to implement the method according to any one of the possible designs or implementations of the first IAB node in the foregoing aspects.

In a possible design, the communication apparatus includes at least one processor and an interface circuit. The at least one processor is configured to: communicate with another apparatus through the interface circuit, and perform the method performed by the first IAB node according to any one of the possible designs or implementations of the first aspect.

According to a twelfth aspect, this application provides a communication apparatus. The communication apparatus is a network device or a chip disposed inside a network device. The communication apparatus has a function of implementing the foregoing aspects of the IAB donor. For example, the communication apparatus includes a corresponding module, unit, or means for performing the steps in the second aspect. The function, the unit, or the means are implemented by software or hardware, or is implemented by hardware executing corresponding software.

In a possible design, the communication apparatus includes a processing unit and a communication unit. The communication unit is configured to receive and send a signal, to implement communication between the communication apparatus and another apparatus. For example, the communication unit is configured to send a first message to a first IAB node. The processing unit is configured to perform some internal operations of the communication apparatus. Functions performed by the processing unit and the communication unit corresponds to the steps in the foregoing aspects of the IAB donor.

In a possible design, the communication apparatus includes a processor, and further includes a transceiver. The transceiver is configured to receive and send a signal, and the processor executes program instructions, to complete the method according to any one of the possible designs or implementations of the second aspect. The communication apparatus further includes one or more memories. The memory is configured to be coupled to the processor. The one or more memories are integrated with the processor, or is disposed independent of the processor. This is not limited in this application. The memory stores a computer program or instructions for implementing the functions in the second aspect. The processor executes the computer program or the instructions stored in the memory. When the computer program or the instructions is/are executed, the communication apparatus is enabled to implement the method according to any one of the possible designs or implementations in the foregoing aspects of the IAB donor.

In a possible design, the communication apparatus includes a processor and a memory. The memory stores a computer program or instructions for implementing the functions in the second aspect. The processor executes the computer program or the instructions stored in the memory. When the computer program or the instructions is/are executed, the communication apparatus is enabled to implement the method according to any one of the possible designs or implementations in the foregoing aspects of the IAB donor.

In a possible design, the communication apparatus includes at least one processor and an interface circuit. The at least one processor is configured to: communicate with another apparatus through the interface circuit, and perform the method according to any one of the possible designs or implementations in the foregoing aspects of the IAB donor.

According to a thirteenth aspect, this application provides a computer-readable storage medium. The computer storage medium stores computer-readable instructions. When the computer-readable instructions are read and executed on a computer, the computer is enabled to perform the method according to any one of the possible designs in the foregoing aspects.

According to a fourteenth aspect, this application provides a computer program product. When the computer program product is read and executed on a computer, the computer is enabled to perform the method according to any one of the possible designs in the foregoing aspects.

According to a fifteenth aspect, this application provides a chip. The chip includes a processor. The processor is coupled to a memory, and is configured to read and execute a software program stored in the memory, to implement the method according to any one of the possible designs in the foregoing aspects.

These aspects or other aspects are clearer and more comprehensible in descriptions of the following embodiments.

DESCRIPTION OF EMBODIMENTS

The following further describes in detail embodiments with reference to the accompanying drawings.

Some embodiments are applied to various mobile communication systems, for example, a first radio (new radio, NR) system, a long term evolution (long term evolution, LTE) system, an advanced long term evolution (advanced long term evolution, LTE-A) system, an evolved long term evolution (evolved long term evolution, eLTE) system, a future communication system, and another communication system. This is not limited herein.

Figure 1A:
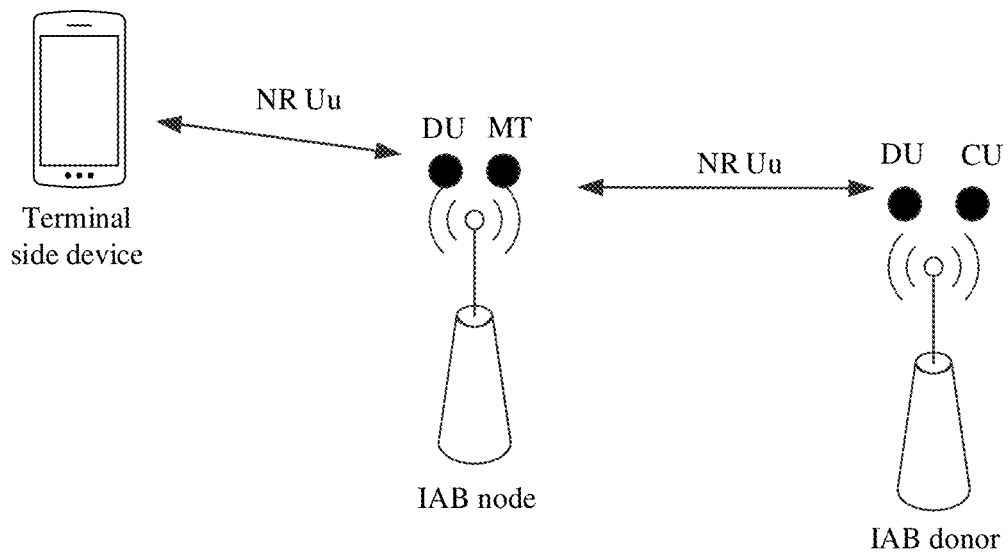
FIG. 1A and FIG. 1B are a schematic diagram of a network architecture in accordance with some embodiments.
Figure 1B:
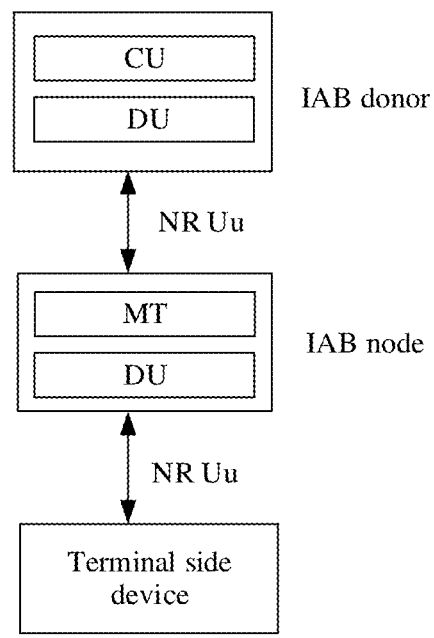

For ease of understanding embodiments, a communication system shown in FIG. 1A is first used as an example to describe in detail a communication system applicable to embodiments. FIG. 1A is a schematic diagram of a communication system to which a communication method in some embodiments is applicable. As shown in FIG. 1A, the communication system includes an IAB donor gNodeB, an IAB node, and a terminal device. FIG. 1B is another expression form of the communication system shown in FIG. 1A. Meanings of substantive expressions are consistent, and details are not described herein again.

In addition, FIG. 1A and FIG. 1B further show names of interfaces between devices, for example, a radio interface (which is named as an NR Uu interface in the figure) between the terminal device and the IAB node and a radio interface (which is referred to as an NR radio backhaul interface, and is named as an NR Uu interface in the figure because communication through the interface is performed further based on an NR Uu interface protocol) between the IAB node and the IAB donor gNodeB. The names of these interfaces are examples, and do not represent a limitation on the interfaces. When a release of the communication system changes, a corresponding name further is replaced with a name of a corresponding function in another radio communication network.

An IAB network shown in FIG. 1A supports multi-hop networking. For example, there is one or more intermediate IAB nodes between the IAB node and the IAB donor gNodeB shown in FIG. 1A and FIG. 1B.

The IAB network shown in FIG. 1A supports both multi-hop networking and multi-connection networking. There is at least one transmission path including a plurality of links between the terminal device served by the IAB node and the IAB donor. Alternatively, there is one or more transmission paths between the IAB node and the IAB donor, and each transmission path includes one or more IAB nodes. On a transmission path, each IAB node considers an adjacent node that provides an access and backhaul service for the IAB node as a parent node, and correspondingly, each IAB node is considered as a child node of the parent node of the IAB node. For example, in the scenarios shown in FIG. 1A and FIG. 1B, a parent node of the IAB node is the IAB donor, and the IAB donor considers the IAB node as a child node.

Figure 2A:
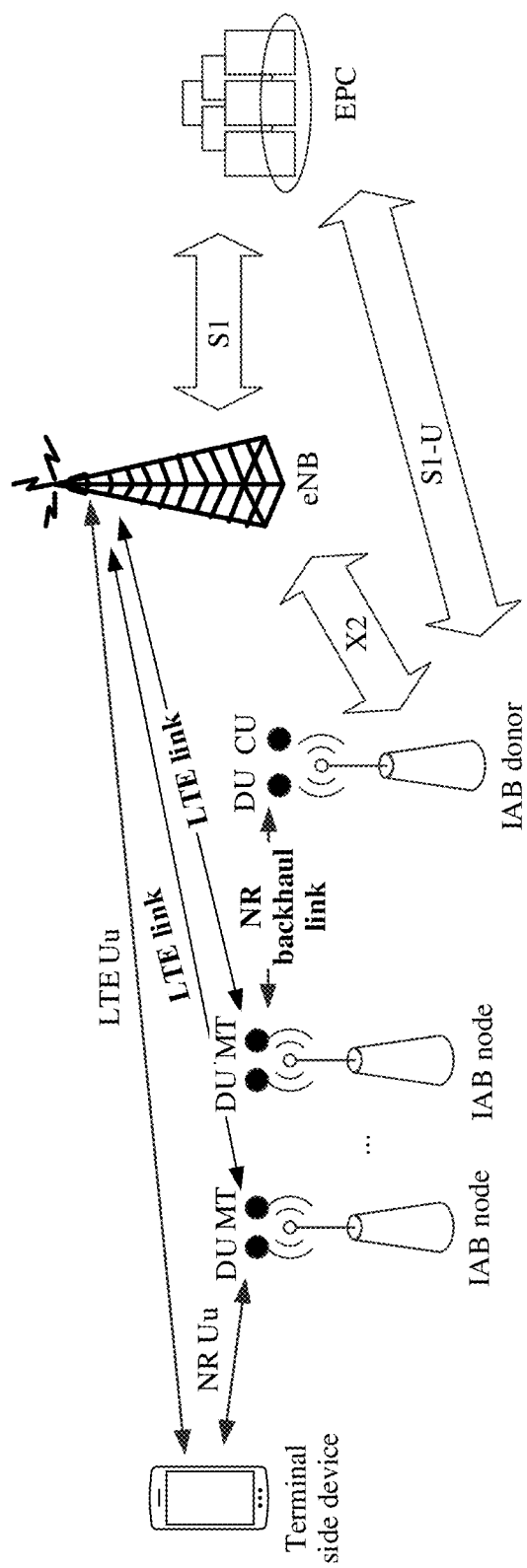
FIG. 2A and FIG. 2B are a schematic diagram of another network architecture in accordance with some embodiments.
Figure 2B:
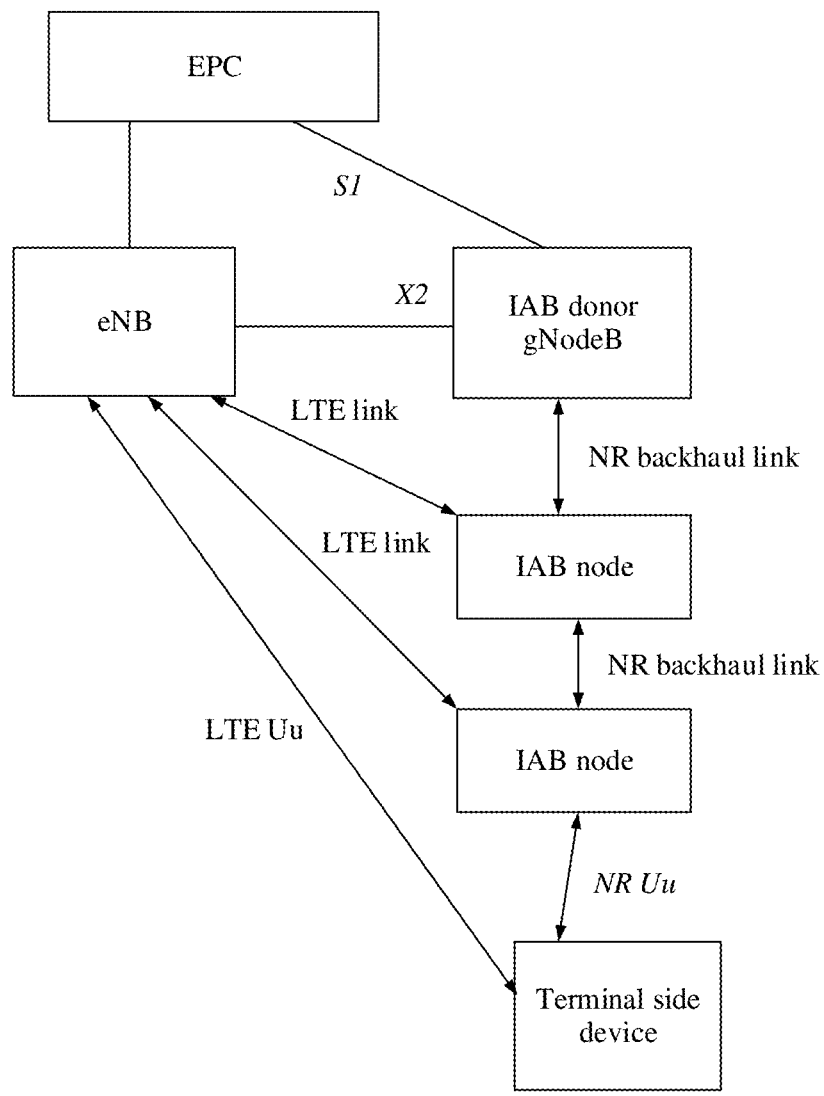

The IAB networking scenario shown in FIG. 1A is an example. In an IAB scenario combining multi-hop and multi-connection, there are other connection forms. For example, this application is further applied to a dual connectivity scenario. Details are shown in FIG. 2A. FIG. 2A shows a schematic diagram of a network architecture of an E-UTRAN NR dual connectivity (E-UTRAN NR Dual Connectivity, EN-DC) system. As shown in FIG. 2A, the communication system includes a packet data core network (evolved packet core, EPC) device, a base station (eNB) in an LTE system, an IAB donor, IAB nodes, and a terminal device. An EN-DC networking manner shown in FIG. 2A further is referred to as non-standalone (non-standalone, NSA) networking of an IAB network. FIG. 2B is another expression form of the communication system shown in FIG. 2A. Meanings of substantive expressions are consistent, and details are not described herein again.

In FIG. 2A, the base station (the eNB in the figure) in the LTE system is a master base station (which therefore further is referred to as a Master eNB, MeNB for short), provides an LTE air interface (LTE Uu) connection for the IAB nodes, and performs user plane data transmission and control plane data transmission with the core network EPC through an Si interface. The IAB donor gNodeB is a secondary base station, provides an NR air interface (NR Uu) connection for the IAB nodes, and performs user plane data transmission with the core network EPC through the Si interface. Similarly, the terminal device further supports dual connectivity. UE is connected to the master base station (the eNB) through the LTE Uu interface, and is connected to the secondary base station (the IAB nodes or the IAB donor gNodeB) through the NR Uu interface.

In some embodiments, FIG. 2A is a networking example, and NSA networking of the IAB network further supports multi-hop IAB networking. For example, the terminal device in FIG. 2A and FIG. 2B is connected to the IAB donor gNodeB through two or more IAB nodes, that is, the IAB nodes are connected to the IAB donor gNodeB over a multi-hop backhaul link. The NSA networking of the IAB network further supports single-hop IAB networking. For example, the terminal device in FIG. 2A and FIG. 2B is connected to the IAB donor gNodeB through one IAB node. In addition, when being connected to the eNB, the IAB node communicates with the eNB over a single-hop LTE link.

In some embodiments, a dual connectivity scenario to which this application is applicable is the EN-DC networking scenario shown in FIG. 2A and FIG. 2B, or includes dual connectivity including an IAB network and an IAB network, or includes dual connectivity including an IAB network and another future communication system. The foregoing example does not constitute any limitation on the scenario.

In some embodiments, the IAB node further is referred to as a relay node (relay node, RN). For ease of description, the IAB node is uniformly used for reference below. The IAB node includes at least one mobile terminal (mobile terminal, MT) unit and at least one distributed unit (distributed unit, DU). In FIG. 1A and FIG. 2A, an example in which the IAB node includes one MT unit and one DU is used for description. The MT unit in the IAB node enables the IAB to serve as a terminal to communicate with a parent node of the IAB node and an IAB donor node, and has a function of user equipment (user equipment, UE). The DU in the IAB node provides an access service for the terminal device or another IAB node attached to the DU, and further communicates with the IAB donor node through an F1 interface. The MT in the IAB node further is referred to as an MT function entity in the IAB node, and the DU in the IAB node further is referred to as a DU function entity in the IAB node. For ease of description, the MT in the IAB node and the MT function entity in the IAB node each are briefly referred to as an "IAB node MT", and the DU in the IAB node and the DU function entity in the IAB node each are briefly referred to as an "IAB node DU". The IAB node provides a radio access service for the terminal device, and service data or control information of the terminal device is transmitted from the IAB node to the IAB donor (IAB donor) or a network side device over a wireless backhaul link.

The IAB donor is an access network element having a complete base station function, or is an access network element in a form in which a centralized unit (centralized unit, CU) is split from a distributed unit (distributed unit, DU). The CU in the IAB donor further is referred to as a CU function entity in the IAB donor, and the DU in the IAB donor further is referred to as a DU function entity in the IAB donor.

For ease of description, in some embodiments, the CU in the IAB donor and the CU function entity in the IAB donor each are briefly referred to as a CU of an IAB donor (further referred to as an IAB-donor-CU), and the DU in the IAB donor and the DU function entity in the IAB donor each are briefly referred to as a DU of an IAB donor (further referred to as an IAB-donor-DU). The CU of the IAB donor alternatively is in a form in which a control plane (control plane, CP) is split from a user plane (user plane, UP). For example, one CU of an IAB donor includes one CU-CP (further referred to as an IAB-donor-CU-CP) and a plurality of CU-UPs (further referred to as IAB-donor-CU-UPs). This is not limited in some embodiments.

The F1 interface in some embodiments is an interface between the DU of the IAB node and the IAB donor gNodeB, an interface between the DU of the IAB node and the CU of the IAB donor gNodeB, or an interface between the IAB node and the IAB donor gNodeB. The F1 interface further is referred to as an F1* interface or the like, which is uniformly referred to as an F1 interface in some embodiments for ease of description, but the name is not limited.

In some embodiments, the F1 interface further is an interface between function entities in a device. For example, for a base station including a DU and a CU, the F1 interface is an interface between the DU in the base station and the CU in the base station.

Figure 3A:
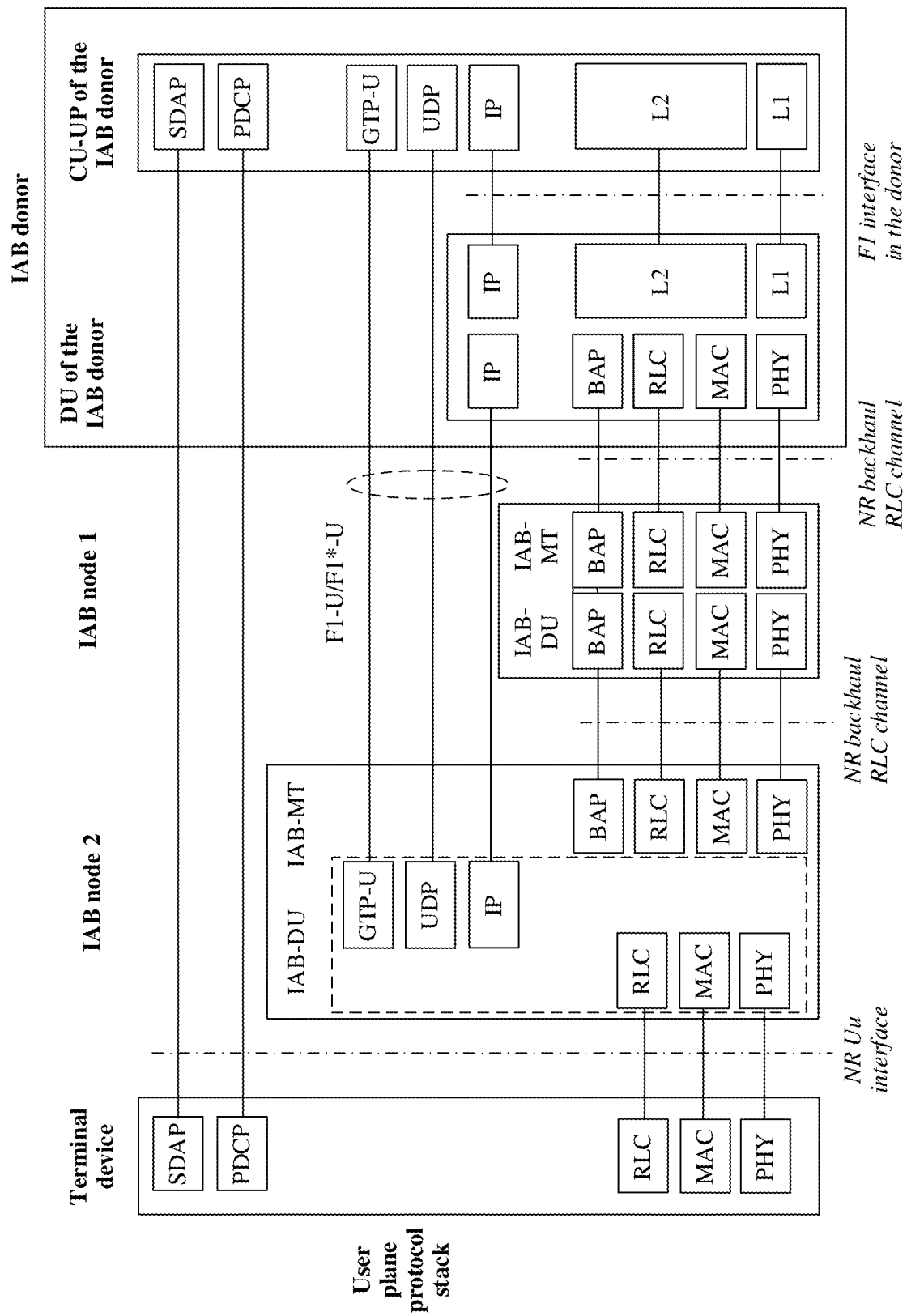
FIG. 3A and FIG. 3B are a schematic diagram of a structure of a protocol stack in accordance with some embodiments.

The F1 interface in some embodiments supports a user plane protocol and a control plane protocol. For example, FIG. 3A is a schematic diagram of a protocol stack of a user plane protocol in accordance with some embodiments. In FIG. 3A, an example in which a link between a terminal device and an IAB donor includes a terminal device, an IAB node 2, an IAB node 1, and an IAB donor is used for description. The IAB donor includes a DU of the IAB donor (IAB-donor-DU) and a CU of the IAB donor (IAB-donor-CU). The CU of the IAB donor includes a control plane functional unit of the CU of the IAB donor (IAB-donor-CU-CP) and a user plane functional unit of the CU of the IAB donor (IAB-donor-CU-UP). Because FIG. 3A shows an example of a user plane protocol stack, the IAB-donor-CU-UP part is shown in the IAB. Correspondingly, the IAB-donor-CU-CP part is shown in a control plane protocol stack in FIG. 3B.

In FIG. 3A, peer protocol layers between the terminal device and the IAB donor include a service data application protocol (Service Data Adaptation Protocol, SDAP) layer and a packet data convergence protocol (packet data convergence protocol, PDCP) layer. Peer protocols between the terminal device and the IAB node 2 include a radio link control (radio link control, RLC) layer, a medium access control (medium access control, MAC) layer, and a physical (Physical, PHY) layer.

Peer protocols that are between the IAB node 2 and the IAB donor and that are on a user plane of an F1 interface include a general packet radio service (General Packet Radio Service, GPRS) tunneling protocol user plane (GPRS Tunneling Protocol User Plane, GTP-U) layer, a user datagram protocol (user datagram protocol, UDP) layer, and an internet protocol (internet protocol, IP) layer. Optionally, the protocol layers on the user plane of the F1 interface further include a PDCP layer and/or an IP security (IP Security, IPsec for short) layer. In a possible implementation, the IPsec layer or the PDCP layer is located above the IP layer and below the GTP-U layer.

Peer protocol layers between the IAB node 2 and the IAB node 1 include a backhaul adaptation protocol (Backhaul Adaptation Protocol, BAP) layer, an RLC layer, a MAC layer, and a PHY layer. Correspondingly, peer protocols between the IAB node 1 and the IAB donor include a BAP layer, an RLC layer, a MAC layer, and a PHY layer.

Figure 3B:
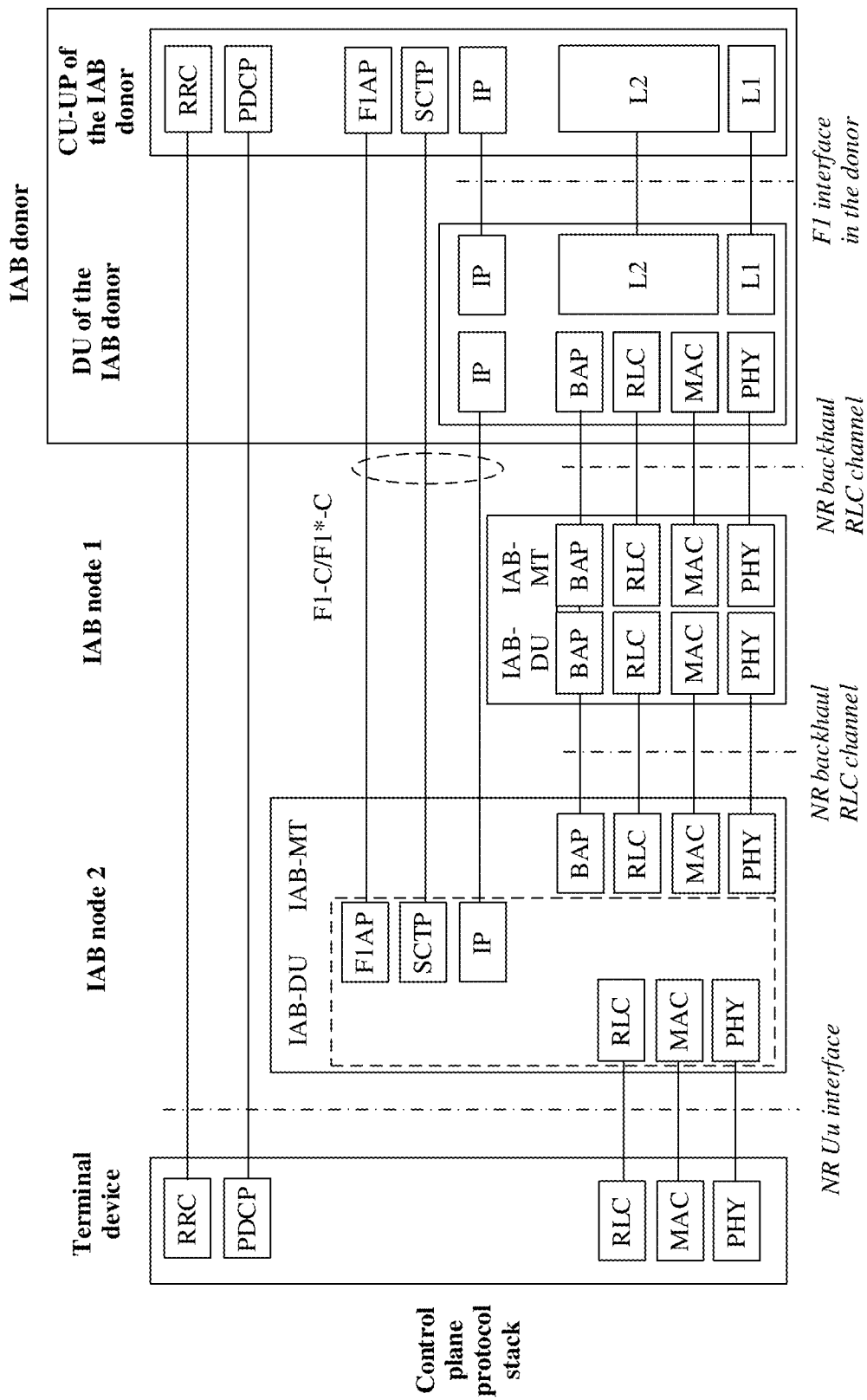

With reference to FIG. 3A, for example, FIG. 3B is a schematic diagram of a protocol stack of a control plane protocol in accordance with some embodiments.

In FIG. 3B, peer protocols between a terminal device and an IAB donor include a radio resource control (radio resource control, RRC) layer and a PDCP layer. Peer protocols between the terminal device and an IAB node 2 include an RLC layer, a MAC layer, and a PHY layer.

Peer protocols that are between the IAB node 2 and the IAB donor and that are on a control plane of an F1 interface include an F1 application layer protocol (F1 application protocol, F1AP) layer, a stream control transport protocol (stream control transport protocol, SCTP) layer, and an IP layer. Optionally, the control plane protocol layer of the F1 interface further includes one or more of a PDCP layer, an IPsec layer, and a datagram transport layer security (datagram transport layer security, DTLS for short) layer. In a possible implementation, the IPsec layer, the PDCP layer, or the DTLS layer is located above the IP layer and below the F1AP layer.

Peer protocols between the IAB node 2 and an IAB node 1 include a BAP layer, an RLC layer, a MAC layer, and a PHY layer. Correspondingly, peer protocols between the IAB node 1 and the IAB donor include a BAP layer, an RLC layer, a MAC layer, and a PHY layer.

The BAP layer has at least one of the following capabilities: adding, to a data packet, routing information (Routing information) that is identified by a radio backhaul node; performing routing selection based on the routing information that is identified by the radio backhaul node; adding, to the data packet, identification information that is identified by the radio backhaul node and that is related to a quality of service (quality of service, QoS for short) parameter; performing QoS mapping on a plurality of links including the radio backhaul node for the data packet; adding data packet type indication information to the data packet; sending stream control feedback information to a node having a stream control capability; and sending backhaul link failure indication information to a child node. In some embodiments, a name of a protocol layer having these capabilities is not a BAP layer. A person skilled in the art understands that any protocol layer having these capabilities are understood as the BAP layer in some embodiments. The routing information that is identified by an IAB node is one or more types of information such as an identifier of a terminal, an identifier of an IAB node accessed by the terminal device, an identifier of a donor node, an identifier of a Donor-DU, an identifier of a Donor-CU, and an identifier of a transmission path.

For example, the node having the stream control capability is a node providing a backhaul service for an IAB node, and is, for example, a donor node, a Donor-DU, a Donor-CU, or a parent node of the IAB node. Content of the stream control feedback information includes one or more types of the following information: a cache status and a load degree of an IAB node, a status (for example, a link blockage (blockage), link resumption (resume), or link quality information) of a link including the IAB node, a bandwidth and a transmission latency of the link including the IAB node, a sequence number of a data packet lost at the IAB node, a sequence number of a data packet successfully sent by the IAB node to a terminal or a child node of the terminal, and the like.

In addition, in a possible case, a function of the BAP layer alternatively is extended from a function or functions of any one or more layers (for example, an RLC layer, a MAC layer, and a PDCP layer) included in a layer 2 without any additional protocol layer.

In some embodiments, for functions and effects of the protocol layers described above, refer to descriptions in an existing standard. Details are not described herein.

In some embodiments, the IAB node MT is configured to have a protocol stack of UE. For a communication protocol stack between the IAB node MT and the IAB donor and a communication protocol stack between the IAB node MT and the parent node, refer to the protocol stacks of UE in FIG. 3A and FIG. 3B for understanding. In this case, the IAB node is further configured to have an RRC layer, and establishes an RRC connection with the IAB donor, to perform communication based on the RRC layer.

In some embodiments, the protocol stack architectures in the IAB network shown in FIG. 3A and FIG. 3B in some embodiments are examples. Methods provided in some embodiments do not depend on the examples, but the examples make the methods provided in some embodiments easier to understand.

In some embodiments, a terminal device is a device having a wireless transceiver function, or a chip that is disposed in the device. The device having the wireless transceiver function further is referred to as user equipment (user equipment, UE), an access terminal, a user unit, a user station, a mobile station, a remote station, a remote terminal, a mobile device, a user terminal, a user agent, or a user apparatus. During actual application, the terminal device in some embodiments is a mobile phone (mobile phone), a tablet computer (Pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in some embodiments. In this application, the foregoing device having the wireless transceiver function and the chip that is disposed in the device are collectively referred to as the terminal device.

In some embodiments, the network side device is a radio access device in various standards, for example, an evolved NodeB (evolved NodeB, eNB), a radio network controller (radio network controller, RNC) or a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless local area network (wireless local area network) system, a wireless relay node, a wireless backhaul node, a transmission point (transmission reception point, TRP, or transmission point, TP). The network side device alternatively is a gNB or a transmission point (TRP or TP) in a 5G (NR) system, one or one group of antenna panels (including a plurality of antenna panels) of a base station in a 5G system, or is a network node that constitutes a gNB or a transmission point, for example, a baseband unit (BBU), or is a DU under a centralized unit—distributed unit (central unit-distributed, CU-DU) architecture.

A network architecture and a service scenario described in some embodiments are intended to describe the technical solutions in some embodiments more clearly, and do not constitute any limitation on the technical solutions provided in some embodiments. A person of ordinary skill in the art knows that with evolution of the network architecture and emergence of another service scenario, the technical solutions provided in some embodiments are further applicable to resolving similar technical problems.

In some embodiments, an IAB scenario in a wireless communication network is used as an example to describe some scenarios. In some embodiments, the solutions in some embodiments is further applied to another wireless communication network, and a corresponding name further is replaced with a name of a corresponding function in another wireless communication network.

The communication method provided in some embodiments involves two scenarios: an F1 interface control plane context update scenario and an F1 interface user plane context update scenario. The following describes the F1 interface control plane context update in detail in the following scenario 1 and scenario 2, and describes the F1 interface user plane context update in detail in the following scenario 3, scenario 4, and scenario 5.

Embodiment 1

Scenario 1: In this embodiment, an IAB donor includes a CU of the IAB donor, a first DU of the IAB donor, and a second DU of the IAB donor. A first IAB node is handed over, in a service range of a CU of a same IAB donor, from the first DU of the IAB donor to the second DU of the IAB donor, that is, the first IAB node is connected to different DUs of the IAB donor before and after the handover. The first IAB node is an IAB node directly connected to the IAB donor, or is connected to the IAB donor over a wireless backhaul link having at least one hop.

Figure 4A:
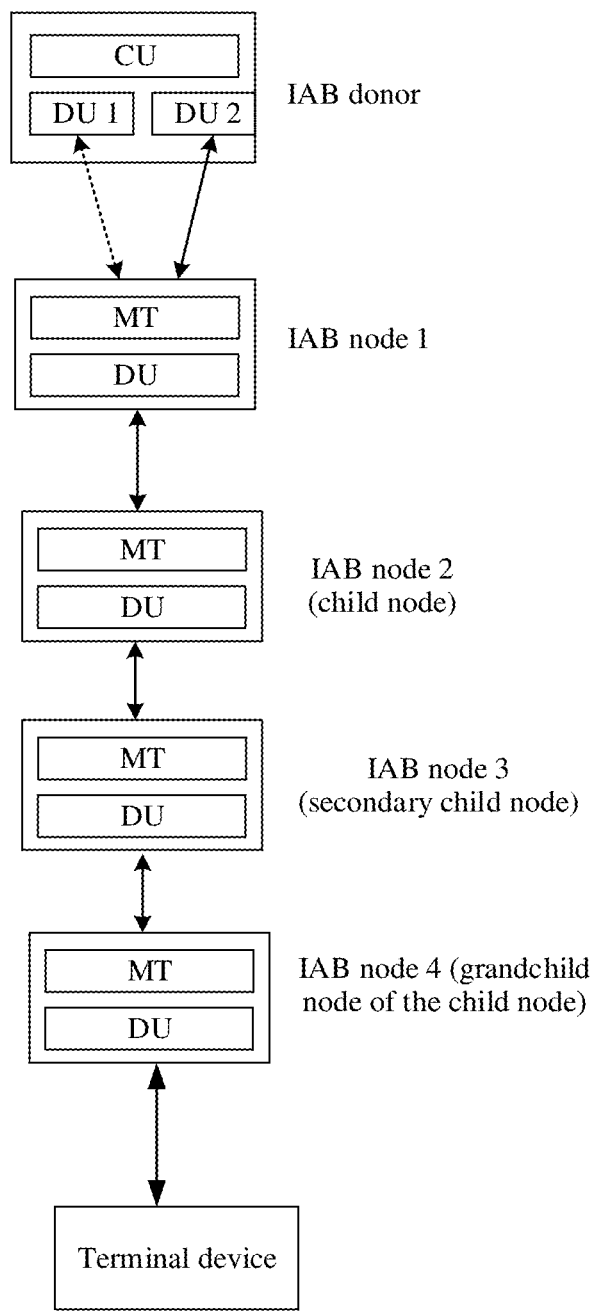
FIG. 4A and FIG. 4B are a schematic diagram of an applicable scenario in accordance with some embodiments.

For example, as shown in FIG. 4A, an IAB node 1 is directly connected to a DU 1 of an IAB donor before handover, and the IAB node 1 is directly connected to a DU 2 of the IAB donor after the handover. The first IAB node in the scenario 1 is the IAB node 1 in FIG. 4A.

Figure 4B:
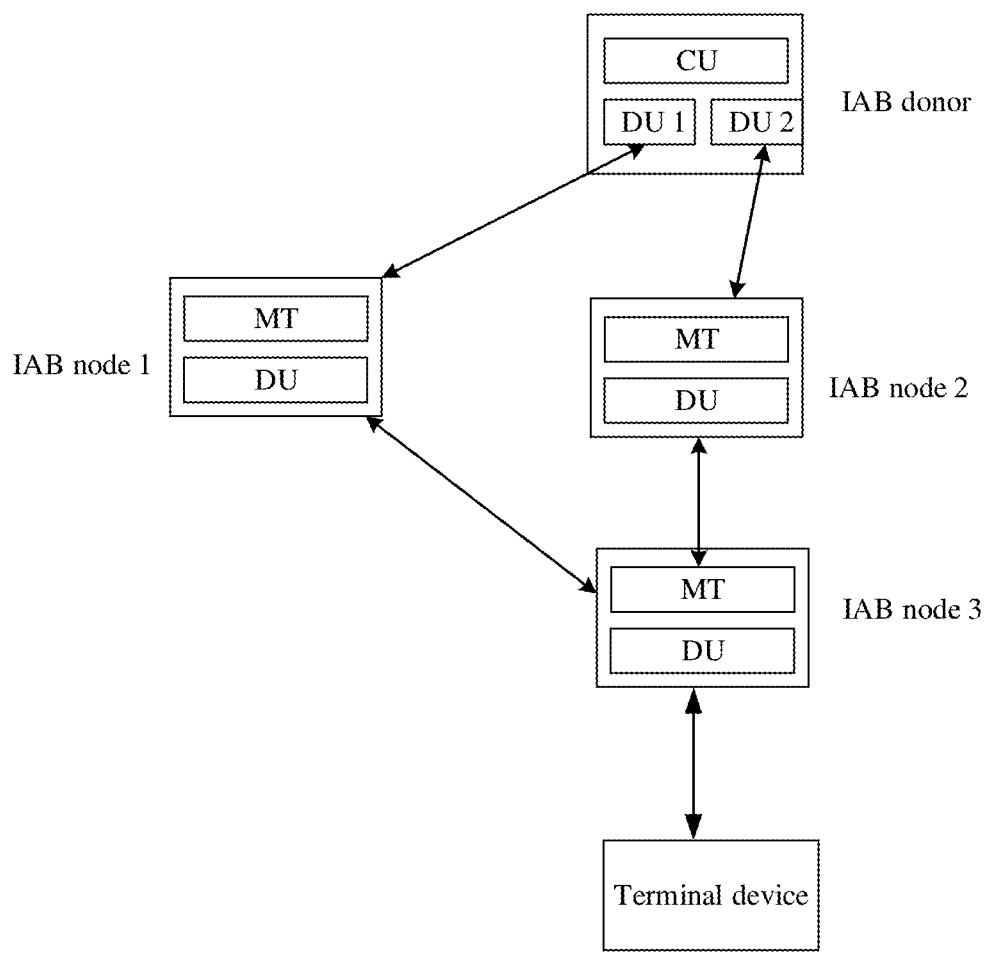

For another example, as shown in FIG. 4B, an IAB node 3 is connected to a DU 1 of an IAB donor over a wireless backhaul link having one hop (in other words, through an IAB node 1) before handover, and the IAB node 3 is connected to a DU 2 of the IAB donor over a wireless backhaul link having one hop (in other words, through an IAB node 2) after the handover. The first IAB node in the scenario 1 is the IAB node 3 in FIG. 4B.

In some embodiments, an IAB node 1 whose parent node changes is further configured to have another child node (for example, the child node connected to the IAB node 1 is an IAB node 2), or the IAB node 1 whose parent node changes is further configured to have a secondary child node of another child node (for example, a secondary child node IAB node 3 connected to an IAB node 2, or a grandchild node IAB node 4 of the child node IAB node 2).

Figure 5:
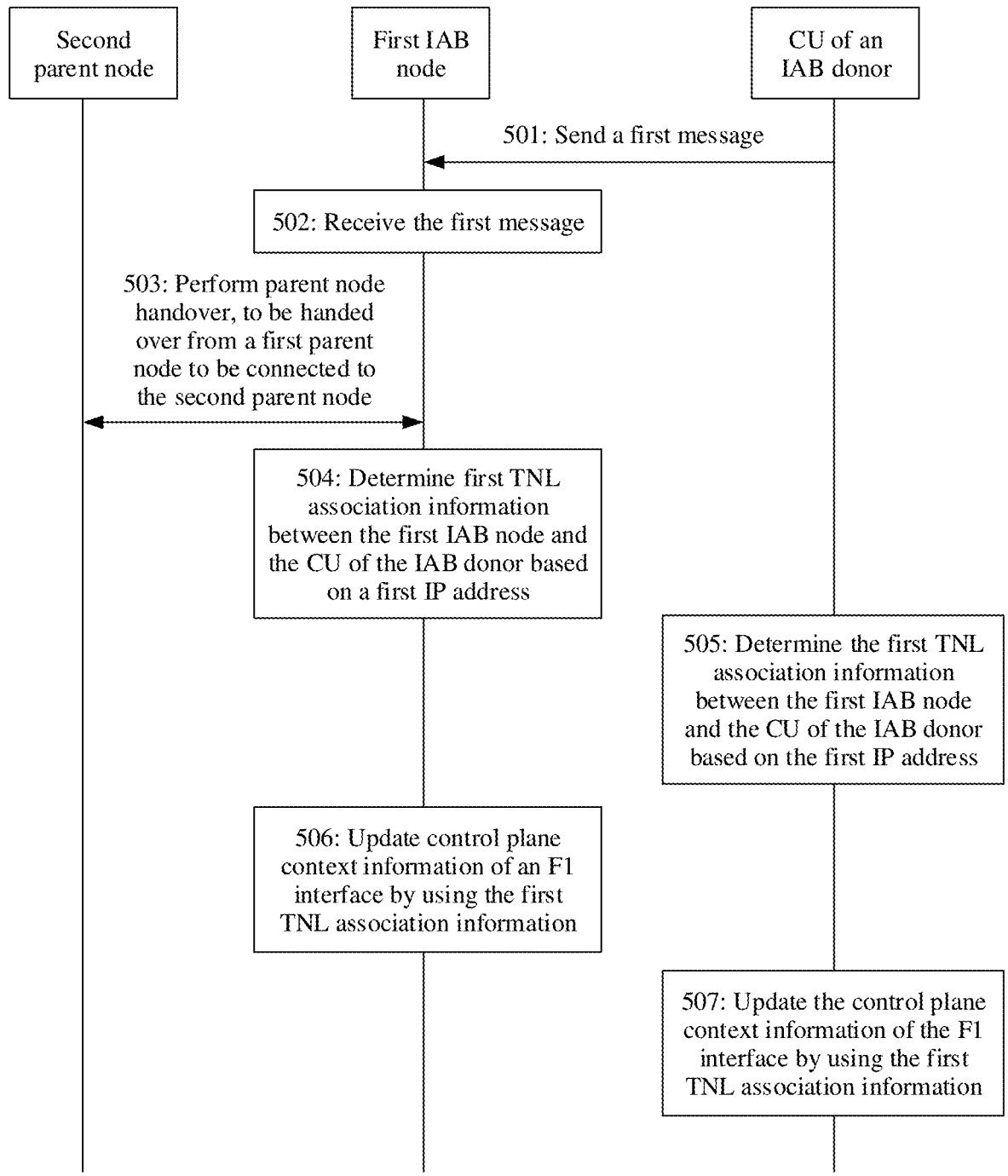
FIG. 5 is a schematic flowchart of a first communication method in accordance with some embodiments.

With reference to the foregoing descriptions, FIG. 5 is a schematic flowchart of a first communication method in accordance with some embodiments. Refer to FIG. 5. The method includes the following steps.

Step 501: A CU of an IAB donor sends a first message to a first IAB node.

In a possible case, the CU of the IAB donor alternatively is replaced with a CU-CP of the IAB donor.

The first message indicates the first IAB node to be handed over from a first parent node to a second parent node. The first parent node is a first DU of the IAB donor, or the first parent node is a second IAB node connected to the CU of the IAB donor through a first DU of the IAB donor. The second parent node is a second DU of the IAB donor, or the second parent node is a third IAB node connected to the CU of the IAB donor through a second DU of the IAB donor.

For example, the first IAB node is the IAB node 1, the first parent node is the DU 1 of the IAB donor to which the IAB node 1 is connected in FIG. 4A, and the second parent node is the DU 2 of the IAB donor to which the IAB node 1 is connected in FIG. 4A.

For another example, the first IAB node is the IAB node 3 in FIG. 4B, and the first parent node is the IAB node 1 to which the IAB node 3 is connected in FIG. 4B. The second parent node is the IAB node 2 to which the IAB node 3 is connected in FIG. 4B.

In a possible implementation, the first message is a higher layer radio resource control (radio resource control, RRC) reconfiguration message. Optionally, when the first parent node is different from the second parent node, the RRC reconfiguration message includes a handover command, or the handover command is the first message, or the first message is carried in another RRC message.

In another possible implementation, when the first parent node is the same as the second parent node, the first message includes updated route configuration information. For example, the IAB node 2 in FIG. 4A may receive a first message from a CU of the IAB donor, where the first message includes updated route configuration information. In some embodiments, the IAB node 2 (which is an MT part of the IAB node 2) does not perform handover in cells served by two different parent nodes, and needs to update route configuration of a BAP layer of the IAB node 2 based on the received first message, to update a transmission route originally passing through the first parent node to the first DU of the IAB donor as a transmission route passing through the first parent node to the second DU of the IAB donor, and to switch from being connected to the first DU of the IAB donor to being connected to the second DU of the IAB donor.

In a possible implementation, the first message includes a first internet protocol (internet protocol, IP) address allocated to the first IAB node. The first IP address includes one or more IP addresses. The first IP address is used by the first IAB node to communicate with the second DU of the IAB donor after the first IAB node is handed over to the second DU of the IAB donor. A manner of obtaining the first IP address by the CU of the IAB donor is as follows: The first IP address is obtained from an IP address pool (pool) maintained by the CU of the IAB donor, or the first IP address is obtained from the second DU of the IAB donor, or the first IP address is obtained from operation, administration, and maintenance (operation administration and maintenance, OAM), or the first IP address is requested from a dynamic host configuration protocol (dynamic host configuration protocol, DHCP) server. The first IAB node updates a control plane context between the IAB node and the CU of the IAB donor based on the first IP address. Moreover, the first message carries the first IP address, so that the IAB node communicates with the CU of the IAB donor by using the first IP address as soon as possible after the handover is completed, thereby reducing a service latency of a terminal device served by the IAB node.

In a possible implementation, the first message further includes an IP address of the CU of the IAB donor, where the IP address is used by the IAB node to perform control plane communication with the CU of the IAB donor; and/or the IP address of the CU of the IAB donor is used by the IAB node to determine first transport network layer (Transport Network Layer, TNL) association information between the first IAB node and the CU of the IAB donor. In this way, the IAB node communicates with the CU of the IAB donor by using the IP address as soon as possible after the handover is completed, thereby reducing impact, caused by the handover of the IAB node, on the service latency of the terminal device served by the IAB node.

Step 502: The first IAB node receives the first message.

In a possible embodiment, the first message is the RRC reconfiguration message, and the first IAB node receives the RRC reconfiguration message from the CU of the IAB donor. The reconfiguration message includes the handover command, and the handover command is an information element that is for the first IAB node to perform reconfiguration with sync (reconfiguration with sync), and indicates the first IAB node to be handed over to a cell served by the second parent node. The second parent node is a cell served by the second DU of the IAB donor.

In another possible embodiment, when the first parent node is the same as the second parent node, the first message received by the first IAB node from the CU of the IAB donor includes the updated route configuration information, indicating configuration of an uplink transmission route from the first IAB node to the second DU of the IAB donor. The updated route configuration information includes any one or more of the following items: one or more BAP layer routing identifiers destined for the second DU of the IAB donor, and a next-hop node identifier (namely, a BAP layer identifier of a parent node of the first IAB node) corresponding to any BAP layer routing identifier. The BAP layer routing identifier destined for the second DU of the IAB donor includes a BAP layer identifier (namely, a BAP address) of the IAB donor (which is the CU of the IAB donor or the second DU of the IAB donor), and further includes an identifier of a path from the first IAB node to the second DU of the IAB donor. The first message is an F1AP message, for example, a gNB-CU configuration update (gNB-CU configuration update) message. Alternatively, the first message is an RRC message, for example, the RRC reconfiguration message.

Step 503: The first IAB node performs parent node handover based on the first message, to be handed over from the first parent node to be connected to the second parent node.

The first parent node is the first DU of the IAB donor, and the second parent node is the second DU of the IAB donor. That is, the first IAB node switches from being connected to the first DU of the IAB donor to being connected to the second DU of the IAB donor.

Specifically, the first IAB node (which is an MT part of the first IAB node) performs handover, and send a random access request in a cell served by the second parent node. After receiving a response message from the second parent node, the first IAB node continues to perform a subsequent access step to complete access to the cell served by the second parent node.

In another possible embodiment, when the first parent node is the same as the second parent node, the first IAB node (which is the MT part of the first IAB node) does not perform handover in cells served by two different parent nodes, and needs to update route configuration of a BAP layer of the first IAB node based on the received first message, to update a transmission route originally passing through the first parent node to the first DU of the IAB donor as a transmission route passing through the first parent node to the second DU of the IAB donor, and to switch from being connected to the first DU of the IAB donor to being connected to the second DU of the IAB donor.

Step 504: The first IAB node obtains the first IP address, and determines the first TNL association information between the first IAB node and the CU of the IAB donor based on the first IP address.

In a possible manner, if the first message received by the first IAB node includes the first IP address, the first IAB node obtains the first IP address after receiving the first message in step 501.

In another possible manner, the first IAB node obtains the first IP address from the OAM. In another possible manner, the first IAB node obtains the first IP address from the second DU of the IAB donor. In the two cases, the first message is unable to include the first IP address.

In some embodiments, TNL association information is information for describing a TNL association, and includes endpoint information of the TNL association (which further is referred to as a stream control transport protocol (stream control transport protocol, SCTP) association). The endpoint information of the TNL association is local endpoint information and/or peer endpoint information of the TNL association, and each piece of endpoint information of the TNL association is an IP address set corresponding to an endpoint. The IP address set includes at least one IP address, and the first IAB node updates the TNL association information by updating the IP address in the IP address set. In this embodiment, the first TNL association information is information for describing a first TNL association, and is TNL association information used when the first IAB node performs connection through the first DU. Second TNL association information is information for describing a second TNL association, and is TNL association information used when the first IAB node performs connection through the second DU. An IP address set in the first TNL association information is different from an IP address set in the second TNL association information. Both the first TNL association and the second TNL association are TNL associations between the first IAB node and the CU of the IAB donor, and the first TNL association and the second TNL association is two different TNL associations, or the first TNL association is a TNL association obtained by updating endpoint information of the second TNL association.

Specifically, in a possible embodiment, the first IAB node establishes the first TNL association between the first IAB node and the CU of the IAB donor by using the first IP address, and generate the first TNL association information. From the perspective of the first IAB node, a local endpoint of the first TNL association is the first IAB node, and a peer endpoint is the CU of the IAB donor. The first TNL association information includes IP address sets/an IP address set corresponding to the local endpoint and/or the peer endpoint of the first TNL association, and the IP address set corresponding to the local endpoint includes the first IP address.

In another possible embodiment, if the second TNL association has been established between the first IAB node and the CU of the IAB donor before the handover, and the first IAB node maintains the second TNL association information, the first IAB node updates the second TNL association information by using the first IP address, that is, adds the first IP address to an IP address set corresponding to a local endpoint of a TNL association in the second TNL association information, to generate the first TNL association information.

Optionally, before performing step 503, the first IAB node further receives indication information from the CU of the IAB donor, or the first message includes indication information, where the indication information indicates that an occasion for the first IAB node to determine the first TNL association information is after the first IAB node is handed over to be connected to the second parent node. For example, if the first IAB node sends an RRC reconfiguration complete message to the CU of the IAB donor, the first IAB node has been handed over to be connected to the second parent node. The second parent node is the second DU of the IAB donor, or the third IAB node connected to the CU of the IAB donor through the second DU of the IAB donor. In this way, the IAB node updates an F1 interface TNL association as soon as possible after the handover is completed, to restore, as soon as possible, a capability of providing a service for the terminal device, and reduce the impact on the service latency of the terminal device.

Step 505: The CU of the IAB donor determines the first TNL association information between the first IAB node and the CU of the IAB donor based on the first IP address.

In a possible embodiment, the CU of the IAB donor establishes the first TNL association between the first IAB node and the CU of the IAB donor by using the first IP address, and generate the first TNL association information. From the perspective of the CU of the IAB donor, a local endpoint of the first TNL association is the CU of the IAB donor, and a peer endpoint is the first IAB node. The first TNL association information includes an IP address set corresponding to an endpoint of the first TNL association, and the IP address set includes the first IP address.

In another possible embodiment, if the second TNL association has been established between the CU of the IAB donor and the first IAB node before the handover, and the CU of the IAB donor maintains the second TNL association information, the CU of the IAB donor updates the second TNL association information by using the first IP address, that is, adds the first IP address to an IP address set corresponding to a peer endpoint of a TNL association in the second TNL association information, to generate the first TNL association information. For example, the first IAB node sends an address configuration change (address configuration change, ASCONF) data chunk (Chunk) to the CU of the IAB donor, where the data chunk carries the first IP address that needs to be added. Optionally, the data chunk further carries indication information (for example, the indication information is an IP address set that is of the first IAB node and that corresponds to the first TNL association) for identifying the first TNL association. After the CU of the IAB donor receives the ASCONF, the CU of the IAB donor adds the first IP address to an IP address set that corresponds to a peer endpoint of a TNL association in the first TNL association and that is maintained by the CU of the IAB donor, and then returns an address configuration acknowledgment (address configuration acknowledgment, ASCONF-ACK) data chunk (Chunk) to the first IAB node, to return a processing status (for example, a configuration success or a configuration error) of an ASCONF parameter to the first IAB node. Then, the CU of the IAB donor sends a data chunk related to the first TNL association to the first IAB node by using the first IP address.

In step 503 and step 504, a four-step handshake procedure is used to establish the first TNL association between the first IAB node and the CU of the IAB donor, which is briefly described as follows:

Step 1: The first IAB node sends an initiation (initiation, INIT) data chunk to the CU of the IAB donor to initiate SCTP association establishment. The initiation data chunk includes parameters such as an initiate tag allocated by the first IAB node to the association, a receiving window capacity reserved for the association, a quantity of recommended output streams, a quantity of input streams, and an initial transmission sequence number (transmission sequence number, TSN) for sending data on the association; and includes optional parameters such as an IP address parameter, a cookie (COOKIE) expiration prevention parameter, a host name address parameter, and a supported address type parameter. After sending the INIT, the first IAB node starts an INIT timer and enters a cookie-wait (WAIT) state.

Step 2: After receiving the INIT data chunk sent by the first IAB node, the CU of the IAB donor sends an initiation acknowledgment (initiation acknowledgment, INIT-ACK) data chunk to the first IAB node, where the initiation acknowledgment data chunk includes state (State) cookie (Cookie). A state cookie parameter includes a message authentication code (message authentication code, MAC), a timestamp generated by the cookie, a lifetime of the cookie, and information for establishing the association. The MAC is obtained through calculation based on the information and a key of a CU end of the IAB donor.

Step 3: After receiving the INIT-ACK data block, the first IAB node first stops the INIT timer and leaves the cookie-wait state, and then sends, to the CU of the IAB donor, a cookie echo COOKIE ECHO data chunk, where the state cookie parameter in the received INIT-ACK data chunk is returned.

Step 4: The CU of the IAB donor sends a cookie acknowledgment (cookie acknowledgment, COOKIE-ACK) data chunk to the first IAB node, to notify the first IAB node that a TNL association (which is specifically, for example, the first TNL association) is successfully established.

Optionally, this embodiment further includes the following step 505.

Step 506: The first IAB node updates control plane context information of an F1 interface by using the first TNL association information, where the F1 interface is an interface between the first IAB node and the CU of the IAB donor.

In a possible embodiment, the first IAB node and the CU of the IAB donor transmit a control plane message of the F1 interface by using the second TNL association between the two nodes. Therefore, the control plane context information of the F1 interface maintained by the first IAB node includes the second TNL association information, and the first IAB node generates the first TNL association information after updating the second TNL association by using the first IP address, and replace the second TNL association information in the control plane context information of the F1 interface with the first TNL association information. When the first IAB node generates the first TNL association information after updating the second TNL association by using the first IP address, the first IAB node adds the first IP address to the IP address set of the local endpoint in the second TNL association information, and further delete another existing IP address from the IP address set.

In another possible embodiment, the first IAB node and the CU of the IAB donor transmit a control plane message of the F1 interface by using the second TNL association between the two nodes. Therefore, the control plane context information of the F1 interface maintained by the first IAB node includes the second TNL association information. After establishing a new first TNL association with the CU of the IAB donor by using the first IP address, the first IAB node adds first TNL association information to the control plane context information of the F1 interface maintained by the first IAB node, that is, the first IAB node uses the first TNL association as one of TNL associations for carrying the control plane message of the F1 interface between the first IAB node and the CU of the IAB donor.

Step 507: The CU of the IAB donor updates the control plane context information of the F1 interface by using the first TNL association information.

In a possible embodiment, the first IAB node and the CU of the IAB donor transmit a control plane message of the F1 interface by using the second TNL association between the two nodes. Therefore, the control plane context information of the F1 interface maintained by the CU of the IAB donor includes the second TNL association information, and the CU of the IAB donor generates the first TNL association information after updating the second TNL association by using the first IP address, and replace the second TNL association information in the control plane context information of the F1 interface with the first TNL association information. When the CU of the IAB donor generates the first TNL association information after updating the second TNL association by using the first IP address, the CU of the IAB donor adds the first IP address to the IP address set of the peer endpoint in the second TNL association information, and further delete another existing IP address from the IP address set.

In another possible embodiment, the first IAB node and the CU of the IAB donor transmit a control plane message of the F1 interface by using the second TNL association between the two nodes. Therefore, the control plane context information of the F1 interface maintained by the CU of the IAB donor includes the second TNL association information. After establishing a new first TNL association with the first IAB node by using the first IP address, the CU of the IAB donor adds first TNL association information to the control plane context information of the F1 interface maintained by the CU of the IAB donor, that is, the CU of the IAB donor uses the first TNL association as one of TNL associations for carrying the control plane message of the F1 interface between the first IAB node and the CU of the IAB donor.

In this embodiment, the TNL association information in the control plane context information of the F1 interface is information (including a source IP address and/or a target IP address used by the TNL association) related to the TNL association for carrying the control plane message of the F1 interface. For example, the first TNL association information includes the first IP address of the first IAB node.

In some embodiments, steps 501 to step 506 shown in FIG. 5 are performed, or some steps are performed. In addition, there is not a strict execution sequence of step 501 to step 506. For example, step 506 is performed before step 505, or step 505 and step 506 is performed in parallel. This is not limited in this embodiment.

Figure 6:
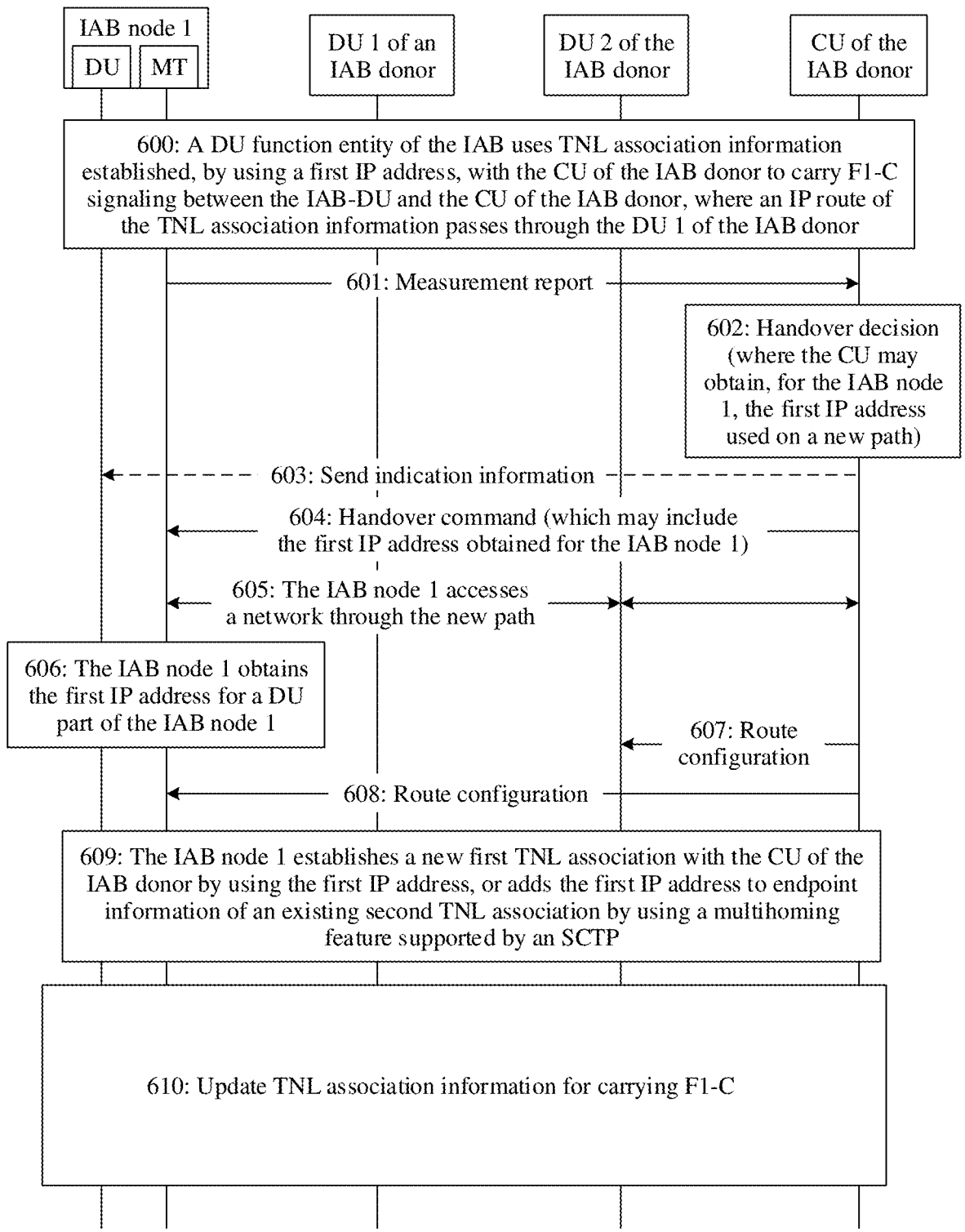
FIG. 6 is a detailed schematic flowchart of another communication method in accordance with some embodiments.

In FIG. 6, in this embodiment, the foregoing communication method is further described by using an example in which a first IAB node is an IAB node 1 that is directly connected to a first DU of an IAB donor (namely, a DU 1 of an IAB donor in FIG. 6), namely, an example in which the first IAB node is the IAB node 1 in FIG. 4A.

Step 600: A DU function entity of the IAB node 1 uses one or more IP addresses to establish second TNL association information with a CU of the IAB donor, where an F1 application layer protocol (F1 application protocol, F1AP) message between the IAB node 1 and the CU of the IAB donor is carried in the second TNL association information. In step 601, the one or more IP addresses are IP addresses that are related to the DU 1 of the IAB donor and that are obtained by the IAB node 1 after the IAB node 1 is connected to the DU 1 of the IAB donor.

Step 601: The IAB node 1 sends a measurement report to the CU of the IAB donor.

Step 602: The CU of the IAB donor makes, based on the measurement report, a handover decision, that is, the IAB node 1 is to be handed over to a DU 2 of the IAB donor.

Optionally, in step 602, the CU of the IAB donor obtains, for the IAB node 1, a new IP address (namely, the first IP address in FIG. 5) used on a path after the handover. Specifically, the CU of the IAB donor obtains one or more new IP addresses. For a quantity of IP addresses that are obtained, refer to a quantity of IP addresses configured for the IAB node 1. The CU of the IAB donor obtains the IP address from an IP address pool (pool) maintained by the CU of the IAB donor, or obtain the IP address from the DU 2 of the IAB donor, or request the IP address from a DHCP server, or obtain the IP address from an OAM.

Optionally, the method further includes step 603: The CU of the IAB donor sends indication information to the IAB node 1.

The indication information is carried in an update message (which is the F1AP message, for example, a gNB-CU CONFIGURATION UPDATE (gNB-CU configuration update) message).

The update message includes at least one of the following items: (1) to-be-removed TNL association information, (2) to-be-added TNL association information, and (3) to-be-updated TNL association information. Each of the three types of association information includes one or more items. The first IAB node determines, based on the indication information, first transport network layer association information after the first IAB node is handed over to the second DU of the IAB donor.

(1) Transport network layer address information (which includes transport network layer address information of the CU of IAB donor, and optionally, further includes transport network layer address information of a DU part of the IAB node 1) included in each item of the to-be-removed TNL association information is transport network layer address information used by a currently established TNL association between the IAB node 1 and the CU of the IAB donor. In some embodiments, if the to-be-removed TNL association information is included, the IAB node 1 needs to perform a corresponding removal operation before step 605.

(2) The to-be-added TNL association information is TNL association information established by the IAB node 1 through a new path after the handover is completed, and transport network layer address information (which includes the transport network layer address information of the IAB donor CU, and further includes transport network layer address information allocated by the IAB donor CU to the DU part of the IAB node 1) included in each item of the association information is transport network layer address information to be used on the new path. In some embodiments, transport network layer address information of a node is an IP address of the node, or an IP address and a transport layer port number of the node.

(3) The to-be-updated TNL association information includes one or more items in a list of to-be-updated TNL associations. Each item includes the transport network layer address information of the CU of the IAB donor and a purpose indication of the TNL association, and is used to overwrite (or replace) corresponding information of an existing TNL association between the IAB node 1 and the CU of the IAB donor.

In some embodiments, step 603 alternatively is performed after step 604.

Step 604: The CU of the IAB donor sends a first message to the IAB node 1, where the first message is, for example, an RRC reconfiguration message, and includes a handover command. The handover command is specifically, for example, a reconfiguration with sync (Reconfiguration with Sync) information element (Information element, IE) in an RRC message, or a mobility control information (Mobility Control Information) information element, and the handover command includes an indication indicating the IAB node 1 to be handed over to be connected to a cell served by the DU 2 of the IAB donor.

Step 605: The IAB node 1 performs handover, and initiates an access request to a new parent node, namely, the DU 2 of the IAB node donor, to complete access on the new path.

Optionally, the method further includes step 606: The IAB node 1 obtains the first IP address.

In a possible embodiment, step 606 is performed together with step 604, and the IAB node 1 obtains the first IP address from the CU of the IAB donor (for example, the first message carries the first IP address of the IAB node 1). In another possible embodiment, the IAB node 1 obtains the first IP address from an OAM, or obtains the first IP address by executing a dynamic host protocol (DHCP).

Optionally, before performing the step, the IAB node 1 further obtains an IP address of the CU of the IAB donor from the CU of the IAB donor.

Step 607: The CU of the IAB donor sends a message to perform route configuration on an intermediate node that the IAB node passes through on the new path, where the intermediate node includes the DU 2 of the IAB donor.

In a possible embodiment, if the IAB node 1 is connected to the IAB donor through a multi-hop backhaul network, in this step, the route configuration further needs to be performed on an intermediate IAB node on a transmission path between the IAB node 1 and the DU 2 of the IAB donor. Content of the route configuration performed on the intermediate node includes one or more downlink routing entries related to the IAB node 1, and further includes one or more uplink routing entries related to the IAB node 1. The downlink routing entry related to the IAB node 1 includes routing information of the IAB node 1 and a corresponding next-hop node. The routing information of the IAB node 1 is an adaptation layer routing identifier (BAP routing ID), which includes a BAP layer identifier (BAP address) and a BAP layer path identifier (BAP path ID) of the IAB node 1, where the path identifier is optional and indicates a transmission path between the IAB donor and the IAB node 1. The uplink routing entry related to the IAB node 1 includes routing information of the IAB donor and a corresponding next-hop node. The routing information of the IAB donor is an adaptation layer routing identifier, which includes a BAP layer identifier and a BAP layer path identifier of the IAB donor, where the path identifier is optional and indicates a transmission path between the IAB node 1 and the IAB donor. When the IAB donor in this step has a CU-DU split structure, the IAB donor is understood as a DU of the IAB donor or a CU of the IAB donor. For the parent node of the IAB node 1 on the new path, the content of the route configuration further includes an adaptation layer identifier (BAP address) of the IAB node 1.

Step 608: The CU of the IAB donor sends a message to perform route configuration on the IAB node 1. Content includes the one or more uplink routing entries related to the IAB node 1. For specific descriptions of the uplink routing entry, refer to the descriptions in step 607 for understanding.

Step 609: The IAB node 1 establishes a new first TNL association with the CU of the IAB donor (which is a CU-CP of the IAB donor) by using the first IP address, and generates first TNL association information, where the established first TNL association is established based on the IP address and/or transport layer port number information in the newly established or updated list provided by the CU in step 603. Alternatively, based on a multihoming feature supported by an SCTP protocol, the IAB node 1 and/or the CU of the IAB donor add/adds the first IP address to endpoint information corresponding to an existing second TNL association, and use/uses the first IP address as a first IP address that is used to transmit a data chunk related to the second TNL association.

Step 610: Each of the IAB node 1 and the CU of the IAB donor updates TNL association information for carrying F1-C.

In some embodiments, this step is implemented in two manners.

Manner 1: The IAB node 1 sends a GNB-CU CONFIGURATION UPDATE ACKNOWLEDGE (CU configuration update success) message to the CU of the IAB donor, where the message carries a transport network layer address of the CU of the IAB donor corresponding to the new first TNL association that is established successfully.

Manner 2: The IAB node 1 sends a GNB-DU CONFIGURATION UPDATE (DU configuration update) message to the CU of the IAB donor, where the message carries a gNB DU ID of the IAB node 1 and the to-be-deleted second TNL association information. The newly established first TNL association is used when the message is transmitted. In this way, after receiving the message, the CU of the IAB donor deletes the corresponding second TNL association information between the CU of the IAB donor and the DU of the IAB node, and transmit the F1AP message between the CU of the IAB donor and the DU of the IAB node by using the newly established first TNL association.

In some embodiments, Manner 1 is applicable when step 603 is performed. If Manner 2 is used, the CU of the IAB donor further returns a response message to the IAB node, where the response message is a GNB-DU CONFIGURATION UPDATE ACKNOWLEDGE (DU configuration update success message) or a GNB-DU CONFIGURATION UPDATE FAILURE (DU configuration update failure). FIG. 6 does not show the step in which the CU of the IAB donor sends the response message to the IAB node 1.

In the two manners, the TNL association information carrying the F1-C signaling between the CU of the IAB donor and the IAB node is updated without reestablishing an F1 connection in a mobile scenario in which the IAB node does not change the IAB donor.

In some embodiments, step 610 is an optional step. If in step 609, the IAB node 1 uses the multihoming feature supported by the SCTP protocol to add the first IP address to information corresponding to an existing first TNL association as the first IP address that is used to transmit a data chunk related to the first TNL association, step 610 is unable to be performed.

In some embodiments, in a topology update process, an IAB node whose parent node changes further includes a child node (another IAB node connected to the IAB node 1) or a secondary child node (a child node of a child node, a grandchild node of a child node, or the like), and control plane contexts of these child nodes or secondary child nodes to be updated. For example, when the first IAB node is the IAB node 2 in FIG. 4A or the IAB node 3 in FIG. 4B, step 603 and step 606 to step 610 is performed to update a TNL association between the first IAB node and the CU of the IAB donor.

In this embodiment, when a parent node of a first IAB node is changed due to IAB topology update, the first IAB node obtains a first IP address, and updates a control plane context between an IAB node and an IAB donor based on the first IP address, to avoid a service latency and signaling overheads caused by F1 interface reestablishment. After the handover is completed, the IAB node performs F1 interface communication with the CU of the IAB donor by obtaining the first IP address. In this way, the IAB node communicates with the CU of the IAB donor by using the first IP address as soon as possible after the handover is completed, thereby reducing impact on a service latency of a terminal device served by the IAB node.

Embodiment 2

Scenario 2: In this embodiment, when an IAB donor is in a form in which a DU and a CU are not split, a first IAB node is handed over from a first IAB donor to a second IAB donor, that is, the first IAB node is connected to different IAB donors before and after the handover; or when an IAB donor is in a form in which a DU and a CU are split, a first IAB donor includes a CU and a DU, and a second IAB donor includes a CU and a DU. A first IAB node is handed over from the DU of the first IAB donor to the DU of the second IAB donor, that is, the first IAB node is connected to different IAB donors before and after the handover. The first IAB node is an IAB node directly connected to the first IAB donor or the second IAB donor, or is connected to the first IAB donor or the second IAB donor through at least one intermediate IAB node.

Figure 7A:
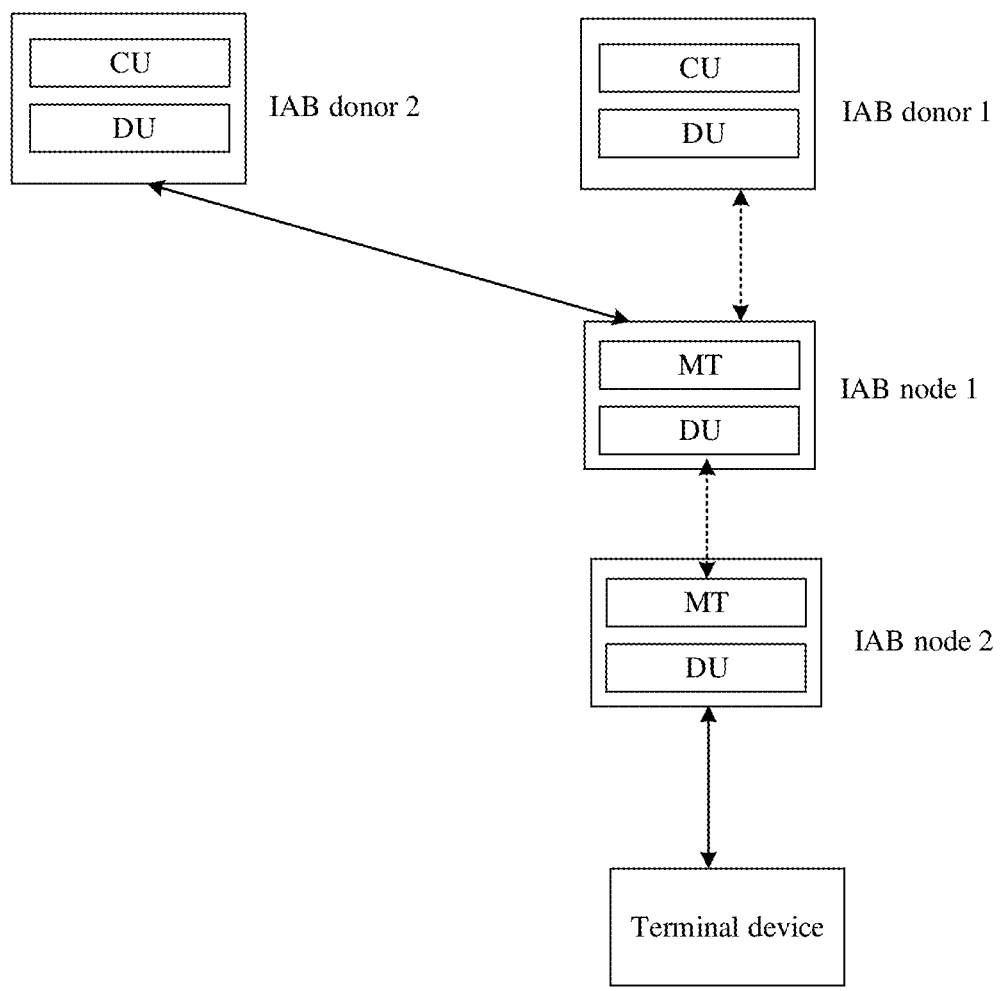
FIG. 7A and FIG. 7B are a schematic diagram of an applicable scenario in accordance with some embodiments.

For example, as shown in FIG. 7A, an IAB node 1 is directly connected to an IAB donor 1 before handover, and the IAB node 1 is directly connected to an IAB donor 2 after the handover. The first IAB node in the scenario 2 is the IAB node 1 in FIG. 7A.

For another example, an IAB node 2 is connected to the IAB donor 1 over wireless backhaul links having two hops (through the IAB node 1) before the IAB node 1 is handed over, and the IAB node 2 is connected to the IAB donor 2 over wireless backhaul links having two hops (through the IAB node 1) after the IAB node 1 is handed over. The first IAB node in the scenario 2 is the IAB node 2 in FIG. 7A.

Figure 7B:
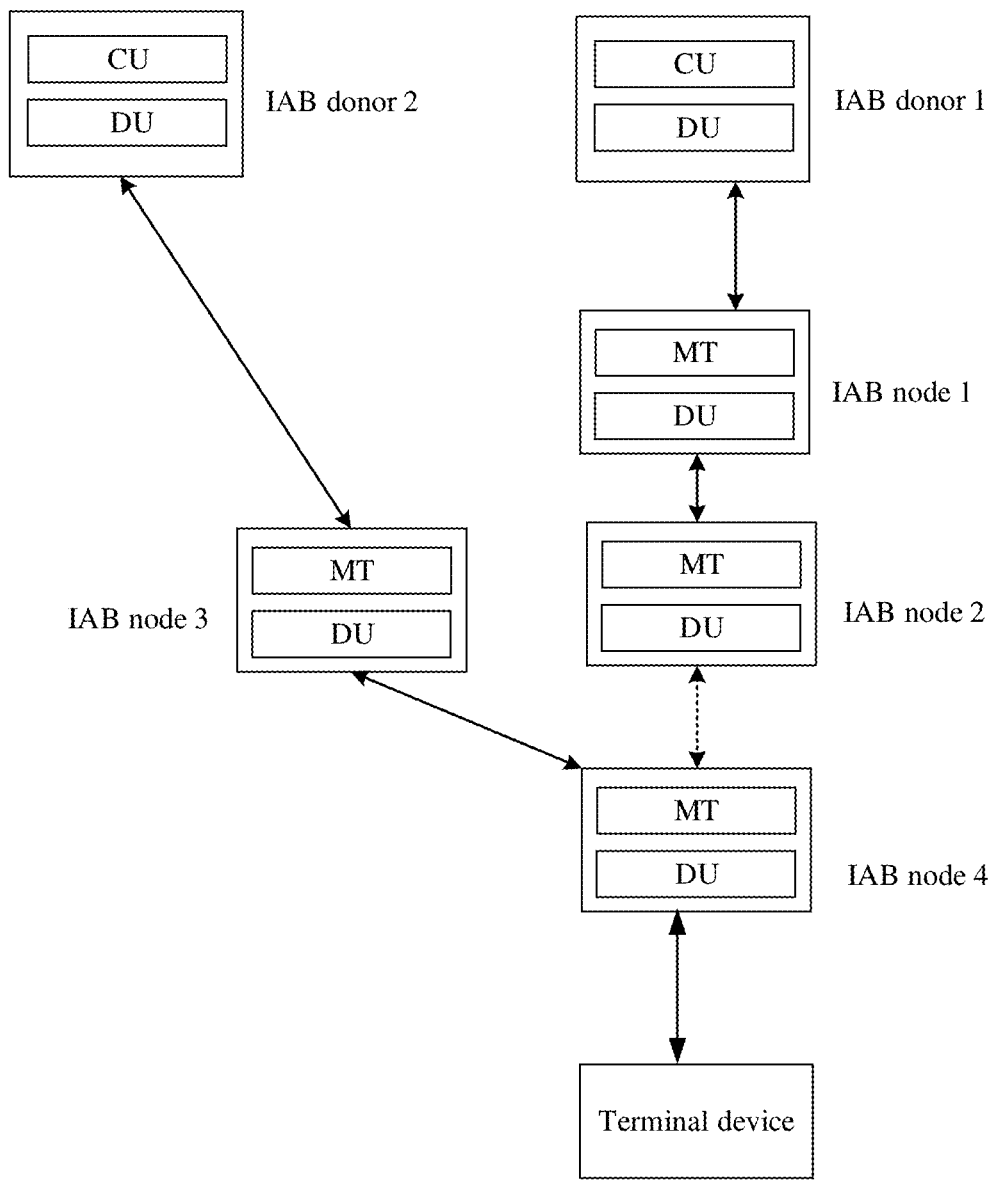

For another example, as shown in FIG. 7B, an IAB node 4 is connected to a DU of an IAB donor 1 over wireless backhaul links having three hops (through an IAB node 1 and an IAB node 2) before handover, and the IAB node 4 is connected to a DU of an IAB donor 2 over wireless backhaul links having two hops (through an IAB node 3) after the handover. The first IAB node in the scenario 2 is the IAB node 4 in FIG. 7B.

Figure 8:
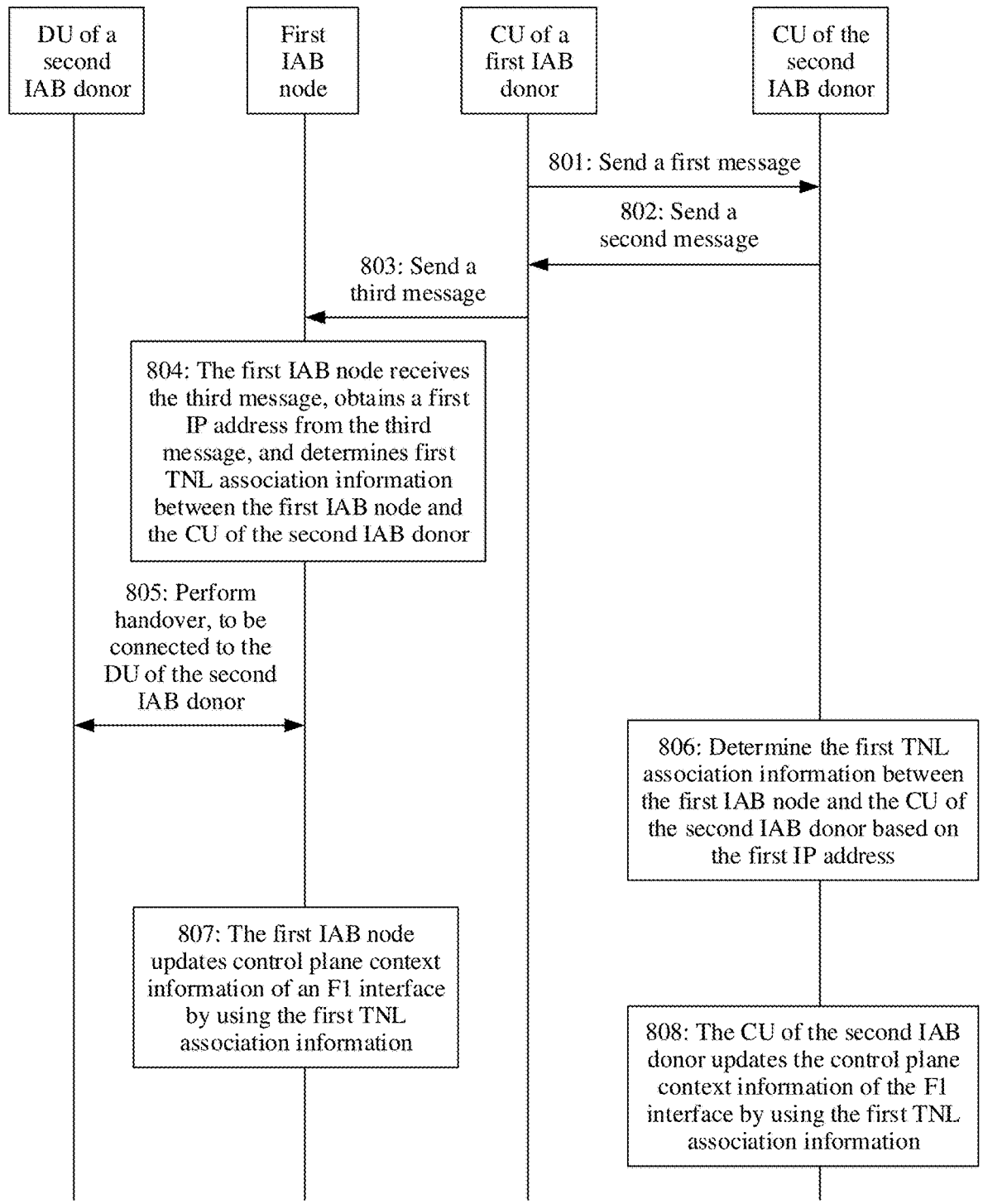
FIG. 8 is a detailed schematic flowchart of another communication method in accordance with some embodiments.

With reference to the foregoing descriptions, FIG. 8 is a schematic flowchart of a second communication method in accordance with some embodiments. Refer to FIG. 8. The method includes the following steps.

Step 801: A CU of a first IAB donor sends a first message to a CU of a second IAB donor, where the first message includes an identifier of a first IAB node, and the first message is for requesting a first address.

The first IAB node is connected to the CU of the first IAB donor before handover, and the first IAB node is connected to the CU of the second IAB donor after the handover. In other words, the first IAB donor is a CU of a source IAB donor of the first IAB node, and the second IAB donor is a CU of a target IAB donor of the first IAB node.

In some embodiments, when the DU and the CU of the IAB donor are not split, step 801 is replaced with the following: A first IAB donor sends a first message to a second IAB donor, where the first message includes an identifier of a first IAB node, and the first message is for requesting a first address. The first IAB node is connected to the first IAB donor before handover, and the first IAB node is connected to the second IAB donor after the handover.

In a possible implementation, the first message is a handover request (HANDOVER REQUEST) message. Optionally, the handover request message includes a user plane context and/or a control plane connection context that are/is maintained by the CU of the first IAB donor and that are/is of an F1 interface between the CU of the first IAB donor and the first IAB node, and the identifier of the first IAB node (for example, a gNB DU ID configured by a DU part of the first IAB node). Optionally, control plane context information of the F1 interface further includes TNL association information that carries a control plane message of the F1 interface.

Step 802: The CU of the second IAB donor sends a second message to the CU of the first IAB donor. The second message includes a first IP address allocated to the first IAB node.

In some embodiments, when the DU and the CU of the IAB donor are not split, step 802 is replaced with the following: The second IAB donor sends a second message to the first IAB donor.

In a possible embodiment, the second message is a handover request acknowledgment (HANDOVER REQUEST ACKNOWLEDGE) message, and the handover request acknowledgment message includes the first IP address allocated by the CU of the second IAB donor to the first IAB node. Optionally, the second message further includes transport network layer address information of the CU of the second IAB donor (which alternatively is a CU-CP of the second IAB donor), which is used by the first IAB node to establish a TNL association with the CU of the second IAB donor.

In a possible embodiment, the first IP address is obtained by the CU of the second IAB donor from an IP address pool of the CU of the second IAB donor, or is obtained by the CU of the second IAB donor from a DU of the second IAB donor, or is obtained by the CU of the second IAB donor from an operation, administration, and maintenance OAM entity, or is obtained by the CU of the second IAB donor from a DHCP server.

Step 803: The CU of the first IAB donor sends a third message to the first IAB node.

In a possible case, when the DU and the CU of the IAB donor are not split, step 803 is replaced with the following: The first IAB donor sends a third message to the first IAB node.

In a possible case, if a control plane and a user plane of the CU of the first IAB donor are split, the CU of the first IAB donor in step 803 is replaced with the CU-CP of the first IAB donor for understanding.

The third message indicates the first IAB node to be handed over to be connected to a cell served by a second parent node. In a possible case, when the DU and the CU of the IAB donor are not split, a first parent node is the first IAB donor, or a first parent node is a second IAB node connected to the first IAB donor. The second parent node is the second IAB donor, or the second parent node is a third IAB node connected to the second IAB donor.

In a possible case, when the DU and the CU of the IAB donor are split, a parent node currently connected to the first IAB node is a first parent node. The first parent node is a DU of the first IAB donor, or the first parent node is a second IAB node connected to the CU of the first IAB donor through a DU of the first IAB donor. The second parent node is a DU of the second IAB donor, or the second parent node is a third IAB node connected to the CU of the second IAB donor through a DU of the second IAB donor.

For example, the first IAB node is the IAB node 1 in FIG. 7A, the first parent node is the DU of the IAB donor 1 to which the IAB node 1 is connected in FIG. 7A, and the second parent node is the DU of the IAB donor 2 to which the IAB node 1 is connected in FIG. 7A.

For another example, the first IAB node is the IAB node 2 in FIG. 7A, the first parent node is the IAB node 1 to which the IAB node 2 is connected in FIG. 7A, and the second parent node is further the IAB node 1 to which the IAB node 2 is connected in FIG. 7A. That is, the first parent node and the second parent node is the same. However, after the IAB node 1 is handed over from the DU of the IAB donor 1 to be connected to the DU of the IAB donor 2, a cell served by the IAB node 1 changes. Therefore, although the parent node connected to the IAB node 2 does not change before and after the handover, the IAB node 2 is actually connected to a different serving cell after the handover.

For another example, the first IAB node is the IAB node 4 in FIG. 7B, and the first parent node is the IAB node 2 to which the IAB node 4 is connected in FIG. 7B. The second parent node is the IAB node 3 to which the IAB node 4 is connected in FIG. 4B.

In a possible implementation, the third message is a higher layer radio resource control (radio resource control, RRC) reconfiguration message. The RRC reconfiguration message includes a handover command, and the handover command is an information element that is for the first IAB node to perform reconfiguration with sync (reconfiguration with sync). Alternatively, the third message is carried in another RRC message.

In a possible implementation, the third message includes the first internet protocol (internet protocol, IP) address allocated to the first IAB node. The first IP address includes at least one IP address, where each of the at least one IP address is an (internet protocol version 4, IPv4) address, or an (internet protocol version 6, IPv6) address, or a network prefix part of an IPv6 address. The first IP address is used by the first IAB node to communicate with the CU of the second IAB donor after the first IAB node is handed over to the DU of the second IAB donor.

In a possible implementation, the first message further includes an IP address of the CU of the second IAB donor, and the IP address is used by the IAB node to perform control plane communication with the CU of the second IAB donor, and/or the IP address of the CU of the second IAB donor is used by the IAB node to determine first TNL association information between the first IAB node and the CU of the second IAB donor.

Step 804: The first IAB node receives the third message, obtains the first IP address from the third message, and determines a first TNL association between the first IAB node and the CU of the second IAB donor.

In a possible implementation, the third message further includes a transport network layer address (for example, the IP address of the CU of the second IAB donor) of the CU of the second IAB donor, and the IP address is used by the first IAB node to perform control plane communication with the CU of the second IAB donor, and/or the IP address of the CU of the second IAB donor is used by the IAB node to determine first TNL association information between the first IAB node and the CU of the second IAB donor.

Optionally, before performing step 804, the first IAB node further receives indication information from the CU of the first IAB donor, or the third message includes indication information, where the indication information indicates that an occasion for the first IAB node to determine the first TNL association information is after the first IAB node is handed over to be connected to the DU of the second IAB donor.

Step 805: The first IAB node performs handover based on the third message, to be handed over from the DU of the first IAB donor to be connected to the DU of the second IAB donor.

Specifically, the first IAB node initiates random access in the cell served by the second parent node. After receiving a response message from the second parent node, the first IAB node continues to perform a subsequent access step to complete access to the cell served by the second parent node.

Step 806: The first IAB node determines the first TNL association information between the first IAB node and the CU of the second IAB donor based on the first IP address and/or the IP address of the CU of the second IAB donor.

In a possible implementation, the first IAB node initiates a first TNL association establishment process to the CU of the second IAB donor by using the first IP address and the IP address of the CU of the second IAB donor, to establish the first TNL association between the first IAB node and the CU of the second IAB donor, and generate the corresponding first TNL association information.

Step 807: The first IAB node updates control plane context information of an F1 interface by using the first TNL association information, where the F1 interface is an interface between the first IAB node and the CU of the second IAB donor.

In a possible embodiment, the first IAB node deletes an existing IP address corresponding to the first TNL association in the control plane context information of the F1 interface, and then add the first IP address to an IP address set corresponding to the first TNL association, to generate the first TNL association information.

In another possible embodiment, the first IAB node adds the newly established first TNL association information to the control plane context information of the F1 interface. The first TNL association information includes the first TNL association and the first IP address, that is, the first IAB node uses the first TNL association as one of TNL associations for carrying a control plane message of the F1 interface between the first IAB node and the CU of the IAB donor.

Optionally, step 807 further includes the following: The first IAB node uses the first TNL association to carry an F1AP message to be sent to the CU of the second IAB donor, where the F1AP message carries the identifier of the first IAB node (for example, the gNB DU ID of the DU part of the first IAB node). The F1AP message is specifically, for example, a gNB-DU CONFIGURATION UPDATE (DU configuration update) message or an F1 SETUP REQUEST (F1 interface setup request) message.

Step 808: The CU of the second IAB donor updates the control plane context information of the F1 interface by using the first TNL association information, where the F1 interface is the interface between the first IAB node and the CU of the second IAB donor.

In a possible embodiment, the CU of the second IAB donor finds, based on the identifier of the first IAB node that is carried in the F1AP message sent by the first IAB node, from the control plane context information of the F1 interface obtained in step 801, control plane context information of an F1 interface corresponding to the identifier of the first IAB node, and then the CU of the second IAB donor deletes existing TNL association information of the control plane context information, and add the first TNL association information.

In another possible embodiment, the CU of the second IAB donor finds, based on the identifier of the first IAB node that is carried in the first message sent by the CU of the first IAB donor, from the control plane context information of the F1 interface obtained in step 801, control plane context information of an F1 interface corresponding to the identifier of the first IAB node. The CU of the second IAB donor adds the first TNL association information to the control plane context information of the F1 interface, where the first TNL association information is for describing the first TNL association, that is, the CU of the second IAB donor uses the first TNL association as one of the TNL associations for carrying the control plane message of the F1 interface between the first IAB node and the CU of the IAB donor.

Figure 9:
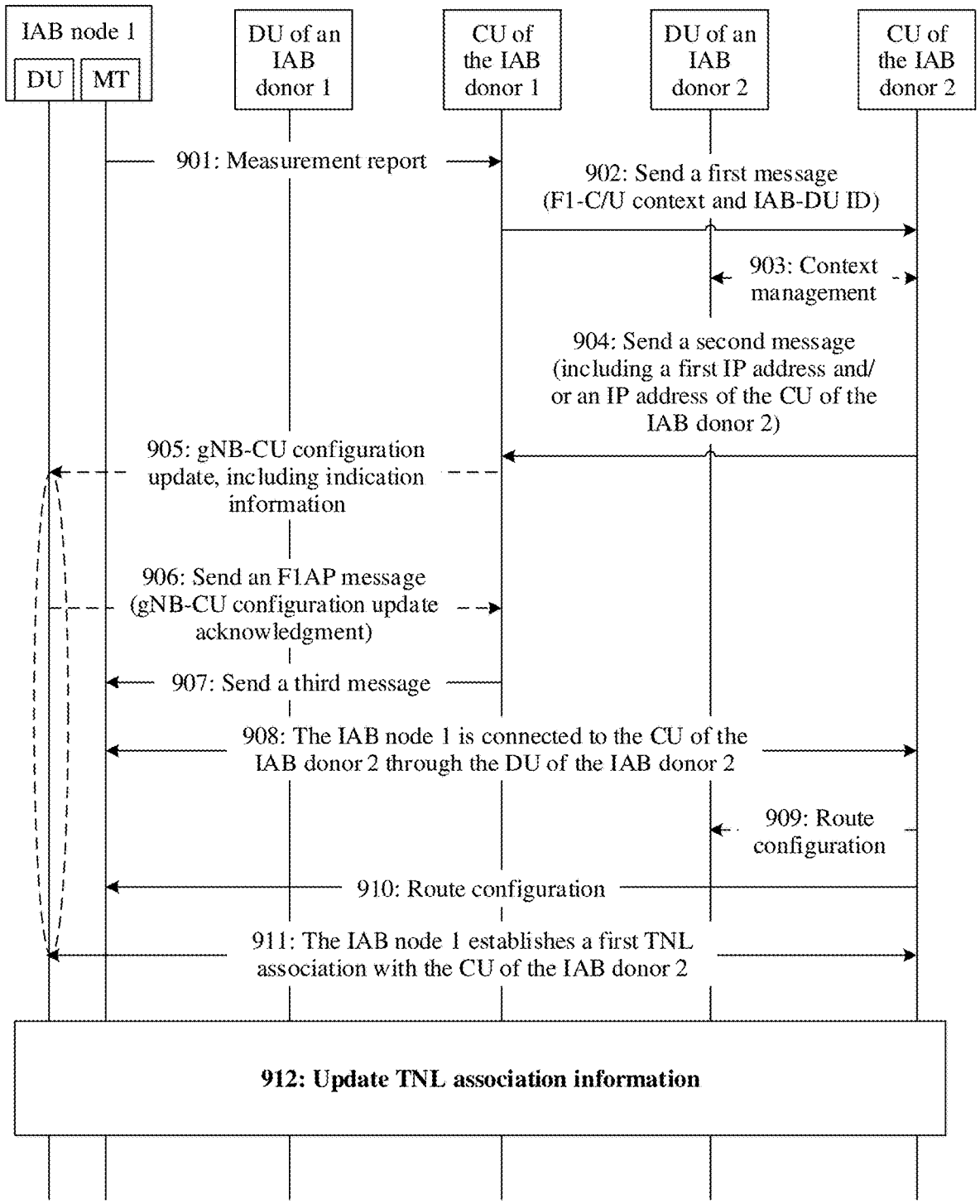
FIG. 9 is a detailed schematic flowchart of another communication method in accordance with some embodiments.

In FIG. 9, an example in which the IAB node 1 in FIG. 7A is handed over from the IAB donor 1 to the IAB donor 2 is further used for description in this embodiment. The following steps are included.

Step 901: The IAB node 1 sends a measurement report to a currently connected CU of the IAB donor 1.

Step 902: The CU of the IAB donor 1 determines to hand over the IAB node 1 to a cell served by the IAB donor 2, and the CU of the IAB donor 1 sends a first message, for example, a handover request (HANDOVER REQUEST) message, to a CU of the IAB donor 2.

The handover request message includes a user plane context and a control plane connection context that are maintained by the CU of the IAB donor 1 and that are of an F1 interface between the CU of the IAB donor 1 and the IAB node 1, and an identifier of the IAB node 1 (for example, a gNB DU ID configured by a DU of the IAB node 1).

In a possible embodiment, control plane context information of the F1 interface further includes context information related to TNL association information that carries a control plane of the F1 interface. The context related to the TNL association information includes transport network layer address information corresponding to the TNL association information. For one piece of transport network layer address information or a transport network layer address information pair, the context related to the TNL association information further includes a purpose of the TNL association information, where the purpose of the TNL association information mainly means that the TNL association information is for carrying UE-related F1AP signaling or carrying non-UE-related F1AP signaling. If the TNL association information is for carrying the UE-related F1AP signaling, the context further includes an identifier of UE (where the UE is UE accessing a cell served by the IAB node 1, or a child node of the IAB node 1). The piece of transport network layer address information or the transport network layer address information pair includes transport network layer address information of the CU of the first IAB donor, and/or transport network layer address information of the first IAB node.

Optionally, this embodiment further includes step 903.

Step 903: If the IAB node 1 is connected to the CU of the IAB donor 2 through a second parent node (namely, a DU of the IAB donor 2 in FIG. 7A) after handover, the CU of the IAB donor 2 further sends, to the second parent node after the IAB node 1 is handed over, an F1AP message (which is a UE CONTEXT SETUP REQUEST) for establishing, by the IAB node 1, context information at a target parent node (the second parent node). Then, the second parent node (the DU of the IAB donor 2) sends context setup response information (which is a UE CONTEXT SETUP RESPONSE) to the CU of the IAB donor 2.

Step 904: The CU of the IAB donor 2 sends a second message to the CU of the IAB donor 1, where the second message is, for example, a handover request acknowledgment (HANDOVER REQUEST ACKNOWLEDGE) message, and includes a first IP address allocated by the CU of the IAB donor 2 to the IAB node 1.

Optionally, the handover request acknowledgment message further includes transport network layer address information of the CU of the IAB donor 2 (which alternatively is a CU-CP of the IAB donor 2), which is used by the IAB node 1 to establish TNL association information with the CU of the IAB donor 2.

Optionally, the second message further includes other configuration information to be sent to the IAB node 1, including any one or more of the following items: an adaptation layer identifier (BAP address) allocated by the CU of the IAB donor 2 to the IAB node 1, one or more uplink BAP routing identifiers (BAP routing IDs) that are available to the IAB node 1 in a network served by the CU of the IAB donor 2, an identifier of a next-hop node (namely, the second parent node after the IAB node 1 is handed over to the CU of the IAB donor 2) corresponding to each uplink BAP routing identifier, a default BH RLC channel identifier (BH RLC channel ID) for transmitting an uplink service on a link between the IAB node 1 and the second parent node, and a mapping relationship between a BH RLC channel between the IAB node 1 and the second parent node and F1-C (a control plane of an F1 interface) signaling type or non-F1 service type of the IAB node 1.

Optionally, step 905 is further included: The CU of the IAB donor 1 sends an F1AP message (for example, a GNB-CU CONFIGURATION UPDATE message) to the IAB node 1, where the F1AP message includes at least one of the following items: (1) to-be-removed TNL association information, (2) to-be-added TNL association information, and (3) to-be-updated TNL association information. Each of the three types of information includes one or more items.

(1) Transport network layer address information included in each item of the to-be-removed TNL association information is transport network layer address information used by a currently established TNL association between the DU of the IAB node 1 and the CU of the IAB donor 1. In some embodiments, if the to-be-removed TNL association information is included, the IAB node 1 needs to perform a corresponding removal operation before step 908. The transport network layer address information included in each item of the to-be-removed TNL association information is transport network layer address information of the CU of the IAB donor 1, and optionally, further includes transport network layer address information of a DU part of the IAB node 1.

(2) The to-be-added TNL association information is TNL association information established by the IAB node 1 through a new path after the handover is completed, and transport network layer address information (which includes the transport network layer address information of the CU of the IAB donor 2, and further includes transport network layer address information allocated by the CU of the IAB donor 2 to the DU part of the IAB node 1) included in each item of the information is transport network layer address information to be used on the new path. Optionally, the message further includes specific indication information indicating that a TNL association indicated by corresponding information needs to be added after the IAB node 1 is handed over to the second parent node. In some embodiments, transport network layer address information of a node is an IP address of the node, or an IP address and a transport layer port number of the node. For example, if the IAB node 1 sends an RRC reconfiguration complete message to the CU of the second IAB donor, the first IAB node is handed over to the second parent node.

(3) The to-be-updated TNL association information includes one or more items in a list of to-be-updated TNL associations. Each item includes the transport network layer address information of the CU of IAB donor 2 and a purpose indication of the TNL association, and is used to overwrite corresponding information of an existing TNL association between the IAB node 1 and the CU of the IAB donor 1. When the CU of the IAB donor 2 is in a form in which a CP and a UP are split, a transport network layer address of the CU of the IAB donor 2 in this embodiment is a transport network layer address of the CU-CP of the IAB donor 2.

Optionally, step 906 is further included: The IAB node 1 feeds back an F1AP message to the CU of the IAB donor 1. Specifically, the F1AP message is a GNB-CU CONFIGURATION UPDATE ACKNOWLEDGE (CU configuration update acknowledgment) message. For content of the message, refer to a current 3GPP protocol (namely, 3GPPTS 38.473). However, the message does not include TNL association information to be established by the IAB node 1 with the CU of the IAB donor 2 based on the information in step 905.

In some embodiments, step 906 is an optional step. Step 906 is performed when step 905 is performed.

Step 907: The CU of the IAB donor 1 sends a third message, for example, an RRC reconfiguration message, to the IAB node 1, where the RRC reconfiguration message includes a handover command, and the handover command indicates the IAB node 1 to be handed over to a cell served by the IAB donor 2.

Optionally, the RRC reconfiguration message further includes at least one first IP address configured by the CU of the IAB donor 2 for the IAB node 1. Each of the at least one first IP address is an address related to the DU of the IAB donor 2 to which the IAB node 1 is connected after the IAB node 1 performs handover. Optionally, the RRC reconfiguration message further includes an IP address of the CU of the IAB donor 2. The IP address is used by the IAB node 1 to perform control plane communication with the CU of the IAB donor 2 on the new path after the IAB node 1 performs handover.

Optionally, the third message further includes other configuration information to be sent to the IAB node 1, including any one or more of the following items: an adaptation layer identifier (BAP address) allocated by the CU of the IAB donor 2 to the IAB node 1, one or more uplink BAP routing identifiers (BAP routing IDs) that are available to the IAB node 1 in a network served by the CU of the IAB donor 2, an identifier of a next-hop node (namely, the second parent node after the IAB node 1 is handed over to the CU of the IAB donor 2) corresponding to each uplink BAP routing identifier, a default BH RLC channel identifier (BH RLC channel ID) for transmitting an uplink service on a link between the IAB node 1 and the second parent node, and a mapping relationship between a BH RLC channel between the IAB node 1 and the second parent node and F1-C (a control plane of an F1 interface) signaling type or non-F1 service type of the IAB node 1.

Step 908: The IAB node 1 initiates a random access request in a cell served by the DU of the IAB donor 2, and is connected to the CU of the IAB donor 2 through the DU of the IAB donor 2 after completing access.

Optionally, this embodiment further includes step 909. If the IAB node 1 is connected to the CU of the IAB donor 2 over a wireless backhaul link having at least one hop, the CU of the IAB donor 2 sends a message to perform route configuration on an intermediate node that the IAB node 1 passes through on the new path. The intermediate node includes the DU of the IAB donor 2, and further includes another IAB node on a transmission path between the IAB node 1 and the DU of the IAB donor 2. Content of the route configuration performed on the intermediate node includes one or more downlink routing entries related to the IAB node 1, and further includes one or more uplink routing entries related to the IAB node 1. The downlink routing entry related to the IAB node 1 includes routing information of the IAB node 1 and a corresponding next-hop node. The routing information of the IAB node 1 is an adaptation layer routing identifier (BAP routing ID), which includes a BAP layer identifier (BAP address) and a BAP layer path identifier (BAP path ID) of the IAB node 1, where the path identifier is optional and indicates a transmission path between the IAB donor and the IAB node 1. The uplink routing entry related to the IAB node 1 includes routing information of the IAB donor 2 and a corresponding next-hop node. The routing information of the IAB donor 2 is an adaptation layer routing identifier, which includes a BAP layer identifier and a BAP layer path identifier of the IAB donor 2, where the path identifier is optional and indicates a transmission path between the IAB node 1 and the IAB donor. When the IAB donor 2 in this step has a CU-DU split structure, the IAB donor 2 is understood as the DU of the IAB donor 2 or the CU of the IAB donor 2. For the second parent node of the IAB node 1 on the new path, content of the route configuration further includes an adaptation layer identifier (BAP address) of the IAB node 1.

Step 910: The CU of the IAB donor 2 sends a message to perform route configuration on the IAB node 1. Content includes the one or more uplink routing entries related to the IAB node 1. For specific descriptions of the content of each uplink routing entry, refer to the descriptions in step 909 for understanding.

Step 911: The IAB node 1 uses a newly configured first IP address to establish a first TNL association with the CU 2 of the IAB donor (which alternatively is the CU-CP of the CU 2 of the IAB donor). The established first TNL association is established based on the transport network layer address information in the to-be-added TNL association information or in the to-be-updated TNL association information provided by the CU 2 of the IAB donor in step 905. Alternatively, the first TNL association is established based on the IP address provided by the CU 2 of the IAB donor in step 907.

Step 912: The IAB node 1 and the CU of the IAB donor 2 updates the TNL association information.

Specifically, the IAB node 1 sends an uplink F1AP message to the CU of the IAB donor 2. Specifically, the uplink F1AP message is a GNB-DU CONFIGURATION UPDATE message or an F1 connection setup request (F1 SETUP REQUEST) message, and carries the gNB DU ID of the IAB node 1. The IAB node 1 uses the newly established first TNL association to carry the F1AP message.

In addition, after receiving the first uplink F1AP message of the IAB node 1, the CU of the IAB donor 2 finds, based on the gNB DU ID, the control plane context information of the F1 interface of the IAB node 1 that is previously received from the CU of the IAB donor 1; replace the second TNL association information that is in the context information and that is for carrying the control plane message of the F1 interface with the IAB node 1 with related information of the newly established first TNL association (including, for example, an IP address set corresponding to an endpoint of the first TNL association, which is a transport network layer address of the CU 2 of the IAB donor and/or a transport network layer address of the IAB node 1); and subsequently transmit an F1AP message between the CU of the IAB donor 2 and the IAB node 1 by using the newly established first TNL association.

In this embodiment, when a parent node of a first IAB node is changed due to IAB topology update, the first IAB node obtains a first IP address, and updates a control plane context between an IAB node and a second IAB donor based on the first IP address, to avoid a service latency and signaling overheads caused by F1 interface reestablishment. After the handover is completed, the IAB node performs F1 interface communication with the CU of the second IAB donor by obtaining the first IP address. In this way, the IAB node communicates with the CU of the second IAB donor by using the first IP address as soon as possible after the handover is completed, thereby reducing impact on the service latency of a terminal device served by the IAB node.

Embodiment 3

Scenario 3: In this embodiment, a first IAB node is handed over, in a service range of a CU of a same IAB donor, from a first DU of the IAB donor to a second DU of the IAB donor, that is, the first IAB node is connected to different DUs of the IAB donor but is connected to a same CU of the IAB donor before and after the handover. The first IAB node and the CU of the IAB donor update a user plane context of an F1 interface in a handover process.

Figure 10:
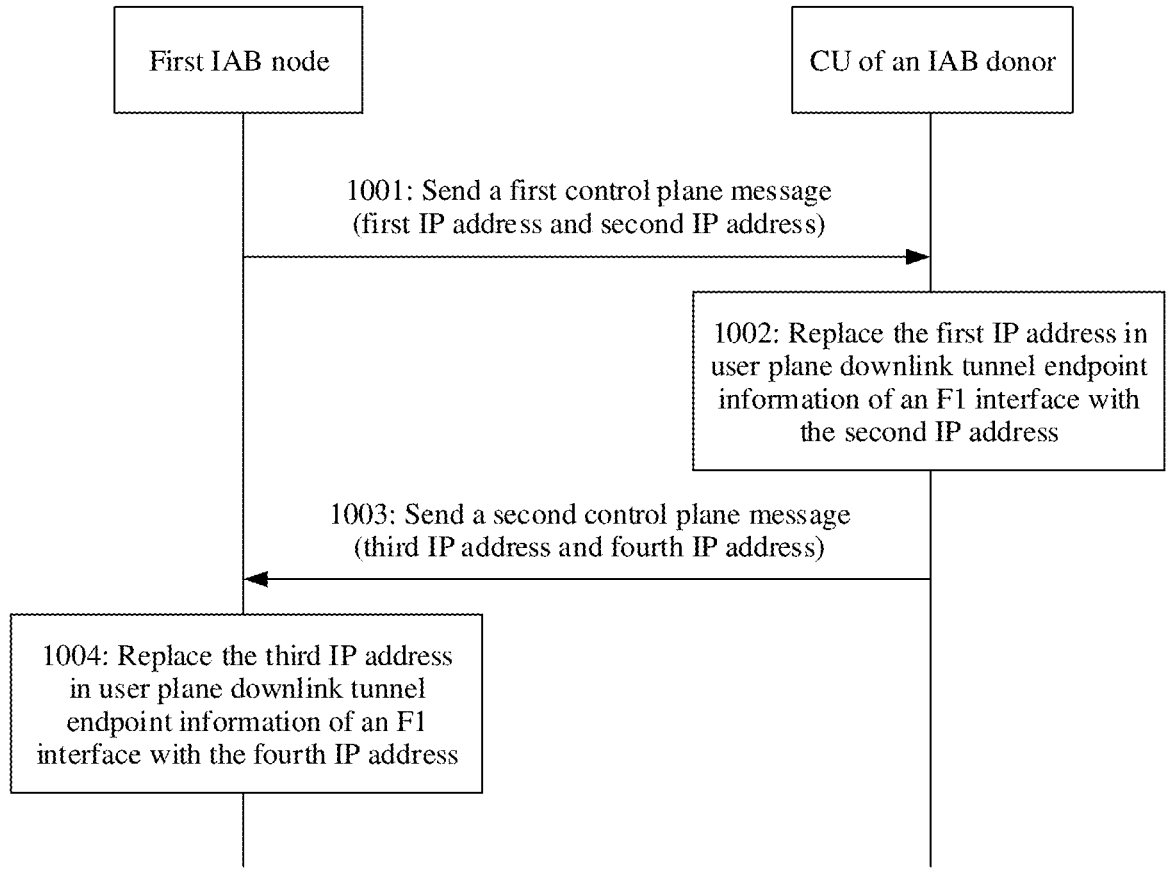
FIG. 10 is a detailed schematic flowchart of another communication method in accordance with some embodiments.

FIG. 10 is a schematic flowchart of a third communication method in accordance with some embodiments. The method is applicable to a case in which a first IAB node is handed over in an IAB donor. Specifically, the IAB donor includes a CU of the IAB donor, a first DU of the IAB donor, and a second DU of the IAB donor. The first IAB node is handed over, in a service range of the CU of the same IAB donor, from the first DU of the IAB donor to the second DU of the IAB donor, that is, the first IAB node is connected to different DUs of the IAB donor before and after the handover. Refer to FIG. 10. The method includes the following steps.

Step 1001: The first IAB node sends a first control plane message to the CU of the IAB donor, where the first control plane message includes a first IP address and a second IP address.

The first control plane message is an F1AP message. The first IP address is an IP address of the first IAB node that is used when the first IAB node communicates with the CU of the IAB donor through a first parent node. The second IP address is an IP address of the first IAB node that is used when the first IAB node communicates with the CU of the IAB donor through a second parent node. The first parent node is the first DU of the IAB donor, or the first parent node is a second IAB node connected to the CU of the IAB donor through the first DU of the IAB donor. The second parent node is the second DU of the IAB donor, or the second parent node is a third IAB node connected to the CU of the IAB donor through the second DU of the IAB donor.

Step 1002: The CU of the IAB donor replaces, with the second IP address, the first IP address in user plane downlink tunnel endpoint information that is maintained by the CU of the IAB donor and that is of an F1 interface between the CU of the IAB donor and the first IAB node.

The CU of the IAB donor, the first DU of the IAB donor, and the second DU of the IAB donor are function entities of a same IAB donor, and the F1 interface is an interface between the first IAB node and the CU of the IAB donor.

In some embodiments, step 1002 occurs after the first IAB node is handed over from the first parent node to the second parent node.

Optionally, this embodiment further includes step 1003: The CU of the IAB donor sends a second control plane message to the IAB node, where the control plane message includes a third IP address and a fourth IP address.

The second control plane message is a downlink F1AP message. The third IP address is an IP address of the CU of the IAB donor that is used when the first IAB node communicates with the CU of the IAB donor through the first parent node. The fourth IP address is an IP address of the CU of the IAB donor that is used when the first IAB node communicates with the CU of the IAB donor through the second parent node. The first parent node is the first DU of the IAB donor, or the first parent node is the second IAB node connected to the CU of the IAB donor through the first DU of the IAB donor. The second parent node is the second DU of the IAB donor, or the second parent node is the third IAB node connected to the CU of the IAB donor through the second DU of the IAB donor.

Step 1004: The first IAB node replaces, with the fourth IP address, the third IP address in user plane uplink tunnel endpoint information that is maintained by the first IAB node and that is of an F1 interface between the first IAB node and the CU of the IAB donor.

In some embodiments, step 1004 is an optional step. Step 1004 is performed after step 1003 is performed. Step 1004 occurs after the first IAB node is handed over from the first parent node to the second parent node. For a specific handover scenario and a handover manner in which the first IAB node is handed over from the first parent node to the second parent node, refer to Embodiment 1.

In some embodiments, in the foregoing method, step 1003 and step 1004 is performed before step 1001 and step 1002.

In this embodiment, when a parent node of the first IAB node is changed due to IAB topology update, the first IAB node updates a user plane context between the IAB node and the IAB donor based on the obtained third IP address and fourth IP address, to avoid a service latency and signaling overheads caused by F1 interface reestablishment.

Embodiment 4

Figure 11A:
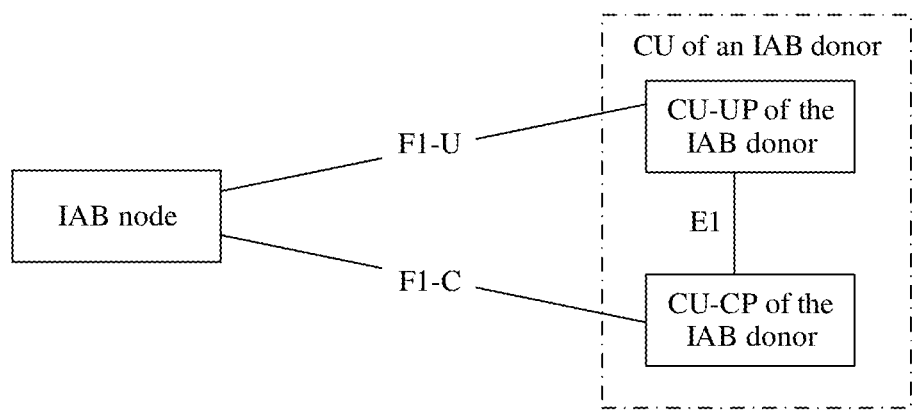
FIG. 11A and FIG. 11B are a detailed schematic flowchart of another communication method in accordance with some embodiments.
Figure 11B:
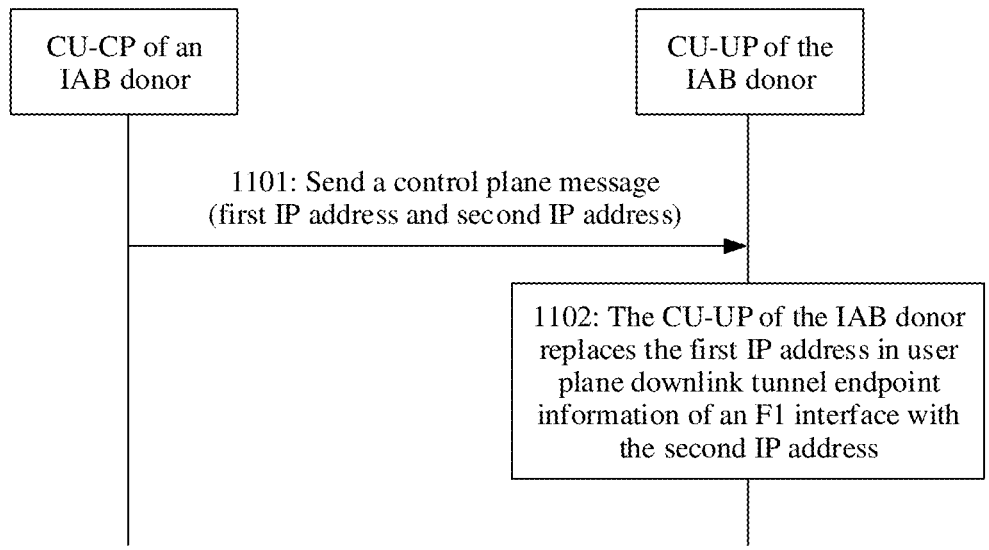

An applicable scenario is the same as the scenario 3, and the scenario is a scenario in which a control plane and a user plane of a CU of an IAB donor are split. FIG. 11A is a schematic flowchart of a fourth communication method in accordance with some embodiments. Refer to FIG. 11B. The method includes the following steps.

Step 1101: A CU-CP of an IAB donor sends a control plane message to a CU-UP of the IAB donor, where the control plane message includes a first IP address and a second IP address.

Optionally, the control plane message is an E1 interface application protocol (E1 Application, E1AP) message between the CU-CP of the IAB donor and the CU-UP of the IAB donor.

The first IP address is an IP address of a first IAB node that is used when the first IAB node communicates with the CU-UP of the IAB donor through a first parent node. The second IP address is an IP address of the first IAB node that is used when the first IAB node communicates with the CU-UP of the IAB donor through a second parent node. The first parent node is a first DU of the IAB donor, or the first parent node is a second IAB node connected to the CU-UP of the IAB donor through a first DU of the IAB donor. The second parent node is a second DU of the IAB donor, or the second parent node is a third IAB node connected to the CU-UP of the IAB donor through a second DU of the IAB donor.

Optionally, in step 1101, the control plane message sent by the CU-CP of the IAB donor to the CU-UP of the IAB donor directly includes one or more pieces of second F1-U interface tunnel information, and further includes first tunnel information corresponding to each piece of second F1-U interface tunnel information or DRB information of UE corresponding to each piece of second F1-U interface tunnel information. The first F1-U interface tunnel information is F1-U interface tunnel information transmitted between the first IAB node and the CU-UP of the IAB donor through the first parent node. The second F1-U interface tunnel information is F1-U interface tunnel information transmitted between the first IAB node and the CU-UP of the IAB donor through the second parent node. Each piece of F1-U interface tunnel information includes an IP address and a GTP tunnel endpoint identifier (tunnel endpoint identifier, TEID). The DRB information of the UE corresponding to each piece of second F1-U interface tunnel information includes an identifier of the UE and a DRB identifier of the UE.

Step 1102: The CU-UP of the IAB donor replaces the first IP address in user plane downlink tunnel endpoint information of an F1 interface with the second IP address.

In this embodiment, when a parent node of the first IAB node is changed due to IAB topology update, the CU-UP of the second IAB donor updates a user plane context between the IAB node and the IAB donor based on the obtained first IP address and second IP address, to avoid a service latency and signaling overheads caused by F1 interface reestablishment.

Embodiment 5

Scenario 5: In this embodiment, a first IAB node is handed over between different IAB donors, that is, the first IAB node is connected to different IAB donors before and after the handover. The first IAB node and a CU of a second IAB donor update a user plane context of an F1 interface in a handover process.

Figure 12A:
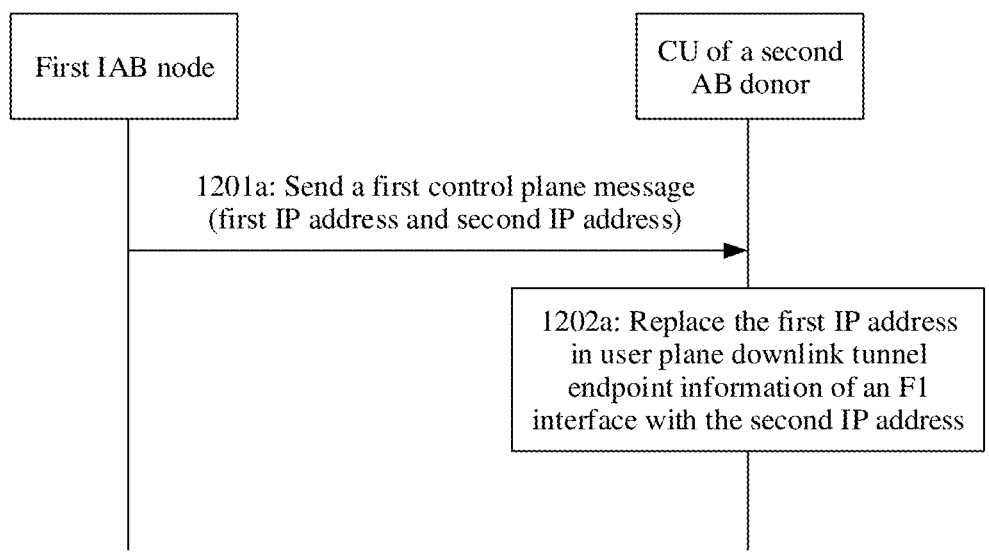
FIG. 12A and FIG. 12B are a detailed schematic flowchart of another communication method in accordance with some embodiments.

FIG. 12A is a schematic flowchart of a fifth communication method in accordance with some embodiments. The method is applicable to a case in which an IAB donor before a first IAB node performs handover is different from an IAB donor after the first IAB node performs handover. Specifically, when the IAB donor is in a form in which a DU and a CU are not split, the first IAB node is handed over from a first IAB donor to a second IAB donor, that is, the first IAB node is connected to different IAB donors before and after the handover; or when the IAB donor is in a form in which a DU and a CU are split, a first IAB donor includes a CU and a DU, and a second IAB donor includes a CU and a DU. The first IAB node is handed over from the DU of the first IAB donor to the DU of the second IAB donor, that is, the first IAB node is connected to different IAB donors before and after the handover. Refer to FIG. 12A. The method includes the following steps.

Step 1201*a*: The first IAB node sends a first control plane message to the CU of the second IAB donor, where the first control plane message includes a first IP address and a second IP address.

The first control plane message is an F1AP message. The first IP address is an IP address of the first IAB node that is used when the first IAB node communicates with the CU of the first IAB donor through a first parent node. The second IP address is an IP address of the first IAB node that is used when the first IAB node communicates with the CU of the second IAB donor through a second parent node. The first parent node is the DU of the first IAB donor, or the first parent node is a second IAB node connected to the CU of the first IAB donor through the DU of the first IAB donor. The second parent node is the DU of the second IAB donor, or the second parent node is a third IAB node connected to the CU of the second IAB donor through the DU of the second IAB donor.

Step 1202*a*: The CU of the second IAB donor replaces, with the second IP address, the first IP address in user plane downlink tunnel endpoint information that is maintained by the CU of the second IAB donor and that is of an F1 interface between the CU of the second IAB donor and the first IAB node.

The F1 interface is an interface between the first IAB node and the CU of the second IAB donor.

For a specific handover scenario and a handover manner in which the first IAB node is handed over from the CU of the first IAB donor to the CU of the second IAB donor, refer to Embodiment 1.

In this embodiment, when a parent node of the first IAB node is changed due to IAB topology update, the CU of the second IAB donor updates a user plane context between the IAB node and the IAB donor based on the obtained first IP address and second IP address, to avoid a service latency and signaling overheads caused by F1 interface reestablishment.

Figure 12B:
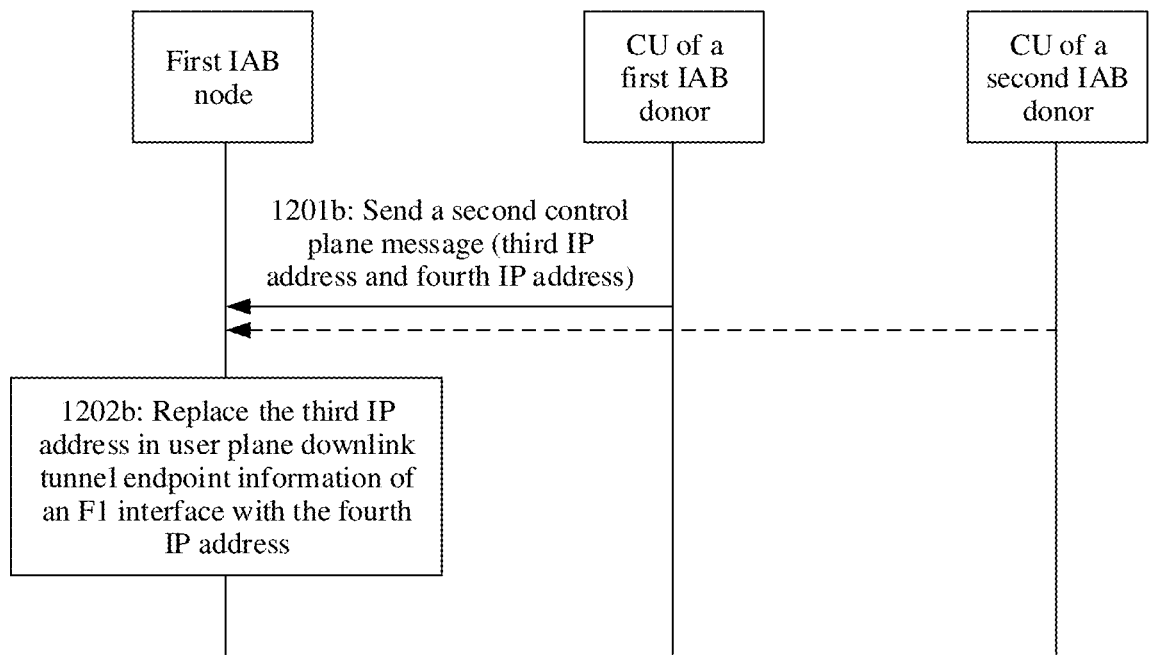

FIG. 12B is a schematic flowchart of a sixth communication method in accordance with some embodiments. The method is further applicable to a case in which an IAB donor before a first IAB node performs handover is different from an IAB donor after the first IAB node performs handover. Specifically, when the IAB donor is in a form in which a DU and a CU are not split, the first IAB node is handed over from a first IAB donor to a second IAB donor, that is, the first IAB node is connected to different IAB donors before and after the handover; or when the IAB donor is in a form in which a DU and a CU are split, a first IAB donor includes a CU and a DU, and a second IAB donor includes a CU and a DU. The first IAB node is handed over from the DU of the first IAB donor to the DU of the second IAB donor, that is, the first IAB node is connected to different IAB donors before and after the handover. Refer to FIG. 12B. The method includes the following steps.

Step 1201*b*: The CU of the first IAB donor sends a second control plane message to the first IAB node, where the second control plane message includes a third IP address and a fourth IP address. The fourth IP address is obtained by the CU of the first IAB donor from the CU of the second IAB donor.

To be specific, before the first IAB node is handed over to the CU of the second IAB donor, the first IAB node obtains the third IP address and the fourth IP address from the CU of the first IAB donor.

Optionally, step 1201*b* alternatively is as follows: The CU of the second IAB donor sends a second control plane to the first IAB node. To be specific, after the first IAB node is handed over to the CU of the second IAB donor, the first IAB node obtains the third IP address and the fourth IP address from the CU of the second IAB donor.

The second control plane message is an F1AP message. The third IP address is an IP address of the CU of the first IAB donor that is used when the first IAB node communicates with the CU of the first IAB donor through a first parent node. The fourth IP address is an IP address of the CU of the second IAB donor that is used when the first IAB node communicates with the CU of the second IAB donor through a second parent node.

Step 1202*b*: The first IAB node replaces, with the fourth IP address, the third IP address in user plane uplink tunnel endpoint information that is maintained by the first IAB node and that is of an F1 interface between the first IAB node and the CU of the second IAB donor.

In some embodiments, in the foregoing method, step 1203 and step 1204 is performed before step 1201 and step 1202.

In this embodiment, when a parent node of the first IAB node is changed due to IAB topology update, the first IAB node updates a user plane context between the IAB node and the IAB donor based on the obtained third IP address and fourth IP address, to avoid a service latency and signaling overheads caused by F1 interface reestablishment.

In some embodiments, (1) Embodiment 1 and Embodiment 5 is separately implemented in different scenarios, or is implemented in combination in a same scenario, or different solutions involved in different embodiments are implemented in combination (for example, some or all solutions involved in Embodiment 1 is implemented in combination with Embodiment 3). This is not limited.

(2) Step numbers in the flowcharts described in some embodiments are an example of an execution procedure, and do not constitute any limitation on an execution sequence of the steps. In some embodiments, there is no strict execution sequence between steps that do not have a time sequence dependency relationship with each other.

The foregoing mainly describes the solutions provided in some embodiments from a perspective of interaction between a network device and a terminal device. In some embodiments, to implement the foregoing functions, the network device or the terminal device includes a corresponding hardware structure and/or a software module for performing each function. A person skilled in the art is aware that, in combination with units and algorithm steps of the examples described in some embodiments disclosed in this specification, embodiments are implemented by hardware or a combination of hardware and computer software. Whether a function is performed by hardware or hardware driven by computer software depends on particular applications and design constraints of the technical solutions. A person skilled in the art may use different methods to implement the described functions for each particular application, but consideration that the implementation goes beyond the scope is unrealistic.

In some embodiments, division into functional units are performed on the terminal device and the network device based on the foregoing method examples. For example, division into each functional unit is based on each corresponding function, or two or more functions are integrated into one unit. The integrated unit is implemented in a form of hardware, or is implemented in a form of a software functional unit.

Figure 13:
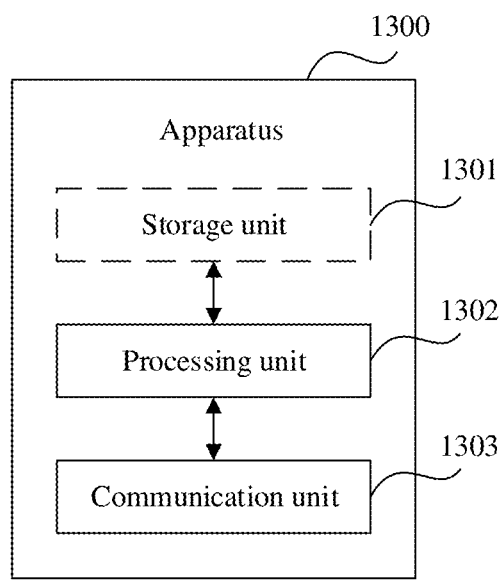
FIG. 13 is a possible example block diagram of an apparatus in accordance with some embodiments.

When an integrated unit is used, FIG. 13 is a possible example block diagram of an apparatus in accordance with some embodiments. As shown in FIG. 13, an apparatus 1300 includes a processing unit 1302 and a communication unit 1303. The processing unit 1302 is configured to control and manage an action of the apparatus 1300. The communication unit 1303 is configured to support communication between the apparatus 1300 and another device. Optionally, the communication unit 1303 is further referred to as a transceiver unit, and includes a receiving unit and/or a sending unit, respectively configured to perform a receiving operation and a sending operation. The apparatus 1300 further includes a storage unit 1301, configured to store program code and/or data of the apparatus 1300.

The apparatus 1300 is the first IAB node in any one of the foregoing embodiments, or is a chip disposed in the first IAB node. The processing unit 1302 supports the apparatus 1300 in performing actions of the first IAB node in the foregoing method examples. Alternatively, the processing unit 1302 mainly performs internal actions of the first IAB node in the method examples, and the communication unit 1303 supports communication between the apparatus 1300 and a network device (for example, a CU of an IAB donor). For example, the communication unit 1303 is configured to perform step 502 in FIG. 5.

The apparatus 1300 is a network device (for example, the CU of the IAB donor or the IAB donor in the foregoing embodiments) in any one of the foregoing embodiments, or is a chip disposed in a network device. The processing unit 1302 supports the apparatus 1300 in performing actions of the network device in the foregoing method examples. Alternatively, the processing unit 1302 mainly performs internal actions of the network device in the method examples, and the communication unit 1303 supports communication between the apparatus 1300 and a first IAB node. For example, the processing unit 1302 is configured to perform internal actions of the IAB donor in the method examples, and the communication unit 1303 is configured to perform step 501 in FIG. 5.

Division of the foregoing apparatus into units is division into logical functions. During actual implementation, all or some of the units are integrated into one physical entity, or is physically separated. In addition, the units in the apparatus are implemented in a form in which a processing element invokes software, or is implemented in a form of hardware; or some units are implemented in a form of software invoked by a processing element, and some units are implemented in a form of hardware. For example, the units are separately disposed processing elements, or is integrated into a chip of the apparatus for implementation. In addition, the units are stored in a memory in a program form, and is invoked by a processing element of the apparatus to perform functions of the units. In addition, all or some of the units are integrated, or is implemented independently. The processing element herein further is referred to as a processor, and is an integrated circuit having a signal processing capability. During implementation, steps in the foregoing methods or the foregoing units are implemented by using a hardware integrated logical circuit in the processor element, or is implemented in the form in which a processing element invokes software.

For example, a unit in any one of the foregoing apparatuses are one or more integrated circuits configured to implement the foregoing methods, for example, one or more application-specific integrated circuits (Application-Specific Integrated Circuits, ASICs), one or more microprocessors (digital signal processors, DSPs), one or more field programmable gate arrays (Field Programmable Gate Arrays, FPGAs), or a combination of at least two of the integrated circuits. For another example, when the unit in the apparatus is implemented by scheduling a program by a processing element, the processing element is a processor, for example, a central processing unit (central processing unit, CPU) or another processor that invokes the program. For another example, the units are integrated together and implemented in a form of a system-on-a-chip (system-on-a-chip, SOC).

The foregoing receiving unit is an interface circuit of the apparatus and is configured to receive a signal from another apparatus. For example, when the apparatus is implemented by a chip, the receiving unit is an interface circuit that is of the chip and that is configured to receive a signal from another chip or apparatus. The foregoing sending unit is an interface circuit of the apparatus and is configured to send a signal to another apparatus. For example, when the apparatus is implemented by a chip, the sending unit is an interface circuit that is of the chip and that is configured to send a signal to another chip or apparatus.

Figure 14:
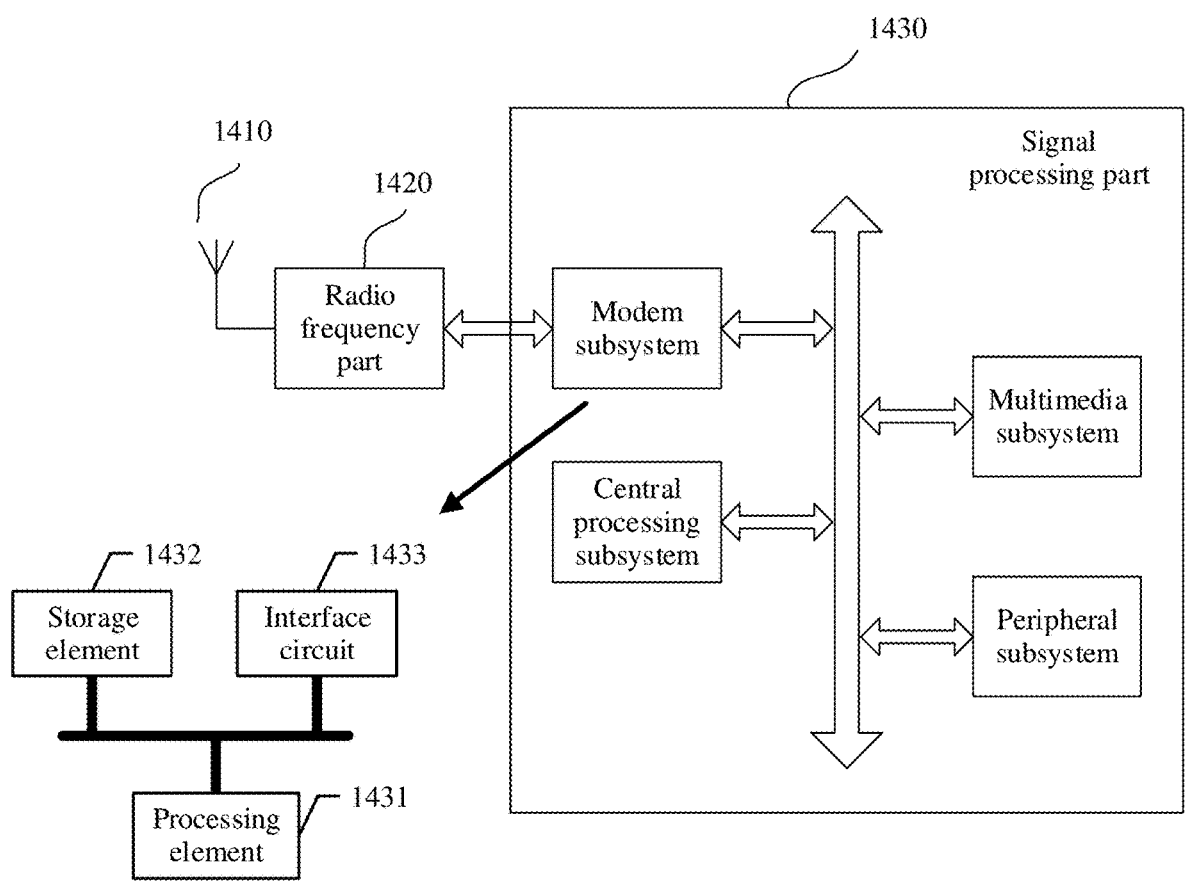
FIG. 14 is a schematic diagram of a structure of a terminal device in accordance with some embodiments.

FIG. 14 is a schematic diagram of a structure of an IAB node in accordance with some embodiments. The IAB node is the IAB node in the foregoing embodiments, and is configured to perform the operations performed by the IAB node in the foregoing embodiments. As shown in FIG. 14, the IAB node includes an antenna 1410, a radio frequency part 1420, and a signal processing part 1430. The antenna 1410 is connected to the radio frequency part 1420. In a downlink direction, the radio frequency part 1420 receives, through the antenna 1410, information sent by a network device, and sends, to the signal processing part 1430 to process, the information sent by the network device. In an uplink direction, the signal processing part 1430 processes information from the IAB node, and sends the information to the radio frequency part 1420. The radio frequency part 1420 processes the information from the IAB node, and then sends the processed information to the network device through the antenna 1410.

The signal processing part 1430 includes a modulation/demodulation subsystem, configured to implement data processing at each communication protocol layer, and further includes a central processing subsystem, configured to process an operating system and an application layer of the IAB node.

The modem subsystem includes one or more processing elements 1431, for example, include one main control CPU and another integrated circuit. In addition, the modem subsystem further includes a storage element 1432 and an interface circuit 1433. The storage element 1432 is configured to store data and a program. However, the program used to perform the methods performed by the IAB node in the foregoing methods is unable to be stored in the storage element 1432, but is stored in a memory outside the modem subsystem, and is loaded and used by the modem subsystem when to be used. The interface circuit 1433 is configured to communicate with another subsystem.

The modem subsystem is implemented by a chip. The chip includes at least one processing element and an interface circuit. The processing element is configured to perform the steps of any method performed by the foregoing IAB node. The interface circuit is configured to communicate with another apparatus. In an implementation, units in the IAB node that implement the steps in the foregoing methods are implemented in a form of scheduling a program by a processing element. For example, an apparatus used in the IAB node includes a processing element and a storage element. The processing element invokes a program stored in the storage element, to perform the methods performed by the IAB node in the foregoing method embodiments. The storage element is a storage element located on a same chip as the processing element, namely, an on-chip storage element.

In another implementation, a program used to perform the methods performed by the IAB node in the foregoing methods are in a storage element located on a different chip from the processing element, namely, an off-chip storage element. In this case, the processing element invokes or loads the program from the off-chip storage element to the on-chip storage element, to invoke and perform the methods performed by the IAB node in the foregoing method embodiments.

In still another implementation, units in the IAB node that implement the steps in the foregoing methods are configured as one or more processing elements. These processing elements are disposed on the modem subsystem. The processing element herein is an integrated circuit, for example, one or more ASICs, one or more DSPs, one or more FPGAs, or a combination of these types of integrated circuits. These integrated circuits are integrated to form a chip.

Units in the IAB node that implement the steps in the foregoing methods are integrated together and implemented in a form of an SOC, and the SOC chip is configured to implement the foregoing methods. At least one processing element and a storage element is integrated into the chip, and the processing element invokes a program stored in the storage element to implement the foregoing methods performed by the IAB node. Alternatively, at least one integrated circuit is integrated into the chip, to implement the foregoing methods performed by the IAB node. Alternatively, with reference to the foregoing implementations, functions of some units may are implemented by invoking a program by the processing element, and functions of some units are implemented by the integrated circuit.

It is learned that the foregoing apparatus used in the IAB node includes at least one processing element and an interface circuit. The at least one processing element is configured to perform any one of the methods performed by the IAB node provided in the foregoing method embodiments. The processing element performs some or all steps performed by the IAB node in a first manner, that is, by invoking a program stored in the storage element; or performs some or all steps performed by the IAB node in a second manner, that is, by combining instructions and a hardware integrated logical circuit in the processor element. Certainly, some or all steps performed by the IAB node is alternatively performed by combining the first manner and the second manner.

The processing element herein is the same as that described above, and is implemented by using a processor. A function of the processing element is the same as a function of the processing unit described in FIG. 13. For example, the processing element is a general-purpose processor, for example, a CPU, or is one or more integrated circuits configured to implement the foregoing methods, for example, one or more ASICs, one or more microprocessors DSPs, one or more FPGAs, or a combination of at least two of these types of integrated circuits. The storage element is implemented by using a memory. A function of the storage element is the same as a function of the storage unit described in FIG. 13. The storage element is implemented by using a memory. A function of the storage element is the same as a function of the storage unit described in FIG. 13. The storage element is one memory, or an umbrella term of a plurality of memories.

In some embodiments, the IAB node shown in FIG. 14 implements processes related to the IAB node in the method embodiments shown in FIG. 5, FIG. 6, and FIG. 8 to FIG. 12B. Operations and/or functions of the modules in the IAB node shown in FIG. 14 are intended to implement the corresponding procedures in the foregoing method embodiments. For details, refer to the descriptions in the foregoing method embodiments. To avoid repetition, detailed descriptions are properly omitted herein.

Figure 15:
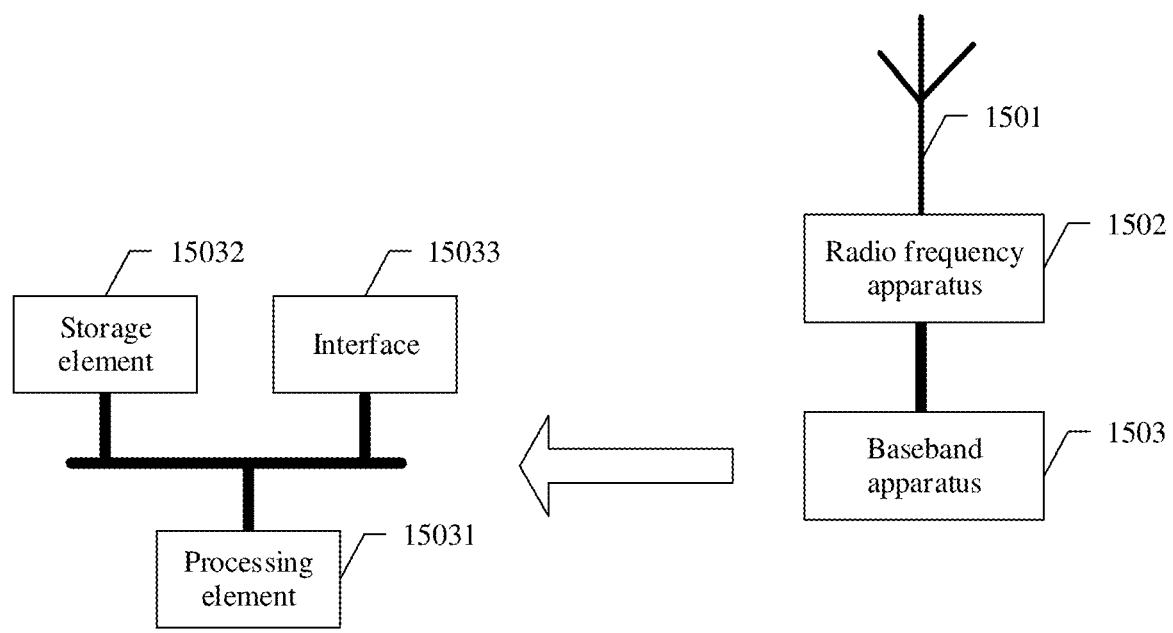
FIG. 15 is a schematic diagram of a structure of a network device in accordance with some embodiments.

FIG. 15 is a schematic diagram of a structure of a network device in accordance with some embodiments. The network device is configured to implement the operations of the network device in the foregoing embodiments. As shown in FIG. 15, the network device includes an antenna 1501, a radio frequency apparatus 1502, and a baseband apparatus 1503. The antenna 1501 is connected to the radio frequency apparatus 1502. In an uplink direction, the radio frequency apparatus 1502 receives, through the antenna 1501, information sent by a terminal device, and sends, to the baseband apparatus 1503 to process, the information sent by the terminal device. In a downlink direction, the baseband apparatus 1503 processes information of the terminal device, and sends the information to the radio frequency apparatus 1502. The radio frequency apparatus 1502 processes the information of the terminal device, and then sends the processed information to the terminal device through the antenna 1501.

The baseband apparatus 1503 includes one or more processing elements 15031, for example, include one main control CPU and another integrated circuit. In addition, the baseband apparatus 1503 further includes a storage element 15032 and an interface 15033. The storage element 15032 is configured to store a program and data. The interface 15033 is configured to exchange information with the radio frequency apparatus 1502, and the interface is, for example, a common public radio interface (common public radio interface, CPRI). The foregoing apparatus used in the network device is located in the baseband apparatus 1503. For example, the foregoing apparatus used in the network device is a chip on the baseband apparatus 1503. The chip includes at least one processing element and an interface circuit. The processing element is configured to perform the steps in any one of the methods performed by the network device. The interface circuit is configured to communicate with another apparatus. In an implementation, units in the network device that implement the steps in the foregoing methods are implemented in a form of scheduling a program by a processing element. For example, an apparatus used in the network device includes a processing element and a storage element. The processing element invokes a program stored in the storage element, to perform the method performed by the network device in the foregoing method embodiments. The storage element is a storage element that is located on a same chip as the processing element, namely, an on-chip storage element, or is a storage element that is located on a different chip from the processing element, namely, an off-chip storage element.

In another implementation, units in the network device that implement the steps in the foregoing methods are configured as one or more processing elements. The processing elements are disposed on the baseband apparatus. The processing element herein is an integrated circuit, for example, one or more ASICs, one or more DSPs, one or more FPGAs, or a combination of these types of integrated circuits. These integrated circuits are integrated to form a chip.

Units in the network device that implement the steps in the foregoing methods are integrated together, and implemented in a form of a system-on-a-chip (system-on-a-chip, SOC). For example, the baseband apparatus includes the SOC chip, and is configured to implement the foregoing methods. At least one processing element and a storage element is integrated into the chip, and the processing element invokes a program stored in the storage element to implement the foregoing methods performed by the network device. Alternatively, at least one integrated circuit is integrated into the chip, to implement the foregoing methods performed by the network device. Alternatively, with reference to the foregoing implementations, functions of some units are implemented by invoking a program by the processing element, and functions of some units are implemented by the integrated circuit.

It is learned that the foregoing apparatus used in the network device includes at least one processing element and an interface circuit. The at least one processing element is configured to perform any one of the methods performed by the network device provided in the foregoing method embodiments. The processing element performs some or all steps performed by the network device in a first manner, that is, by invoking a program stored in the storage element; or performs some or all steps performed by the network device in a second manner, that is, by combining instructions and a hardware integrated logic circuit in the processor element. Certainly, some or all steps performed by the network device is alternatively performed by combining the first manner and the second manner.

The processing element herein is the same as that described above, and is implemented by using a processor. A function of the processing element is the same as a function of the processing unit described in FIG. 10. For example, the processing element is a general-purpose processor, for example, a CPU, or is one or more integrated circuits configured to implement the foregoing methods, for example, one or more ASICs, one or more microprocessors DSPs, one or more FPGAs, or a combination of at least two of these types of integrated circuits. The storage element is implemented by using a memory. A function of the storage element is the same as a function of the storage unit described in FIG. 13. The storage element is implemented by using a memory. A function of the storage element is the same as a function of the storage unit described in FIG. 13. The storage element is one memory, or an umbrella term of a plurality of memories.

The network device shown in FIG. 15 implements processes related to the network device in the foregoing method embodiments. Operations and/or functions of the modules in the network device shown in FIG. 15 are intended to implement the corresponding procedures in the foregoing method embodiments. For details, refer to the descriptions in the foregoing method embodiments. To avoid repetition, detailed descriptions are properly omitted herein.

A person skilled in the art understands that embodiments are provided as a method, a system, or a computer program product. Therefore, some embodiments use a form of a hardware-only embodiment, a software-only embodiment, or an embodiment with a combination of software and hardware. Moreover, some embodiments use a form of a computer program product that is implemented on one or more computer-usable storage media (including but not limited to a disk memory, a CD-ROM, an optical memory, and the like) that include computer usable program code.

Some embodiments are described with reference to the flowcharts and/or block diagrams of the method, the device (system), and the computer program product according to some embodiments. In some embodiments, computer program instructions are used to implement each process and/or each block in the flowcharts and/or the block diagrams and a combination of a process and/or a block in the flowcharts and/or the block diagrams. These computer program instructions are provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions alternatively is stored in a computer-readable memory that indicates a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions alternatively is loaded onto a computer or another programmable data processing device, so that a series of operations and steps are performed on the computer or another programmable device, to generate computer-implemented processing. Therefore, the instructions executed on the computer or another programmable device provide steps for implementing a specific function in one or more processes in the flowcharts and/or in one or more blocks in the block diagrams.

A person skilled in the art is able to make various modifications and variations without departing from the spirit and scope of the disclosed embodiments. This disclosure is intended to cover these modifications and variations provided that these modifications and variations fall within the scope of protection defined by the following claims and equivalent technologies.

What is claimed is:

1. A communication system, comprises:
    a centralized unit (CU) of an integrated access and backhaul (IAB) donor; and
    a first IAB node, wherein the CU of the IAB donor is configured to:
        receive a first control plane message from the first IAB node, wherein:
            the first control plane message includes a first internet protocol IP address and a second IP address;
            the first IP address is an IP address of the first IAB node in response to the first IAB node communicating with the CU of the IAB donor through a first parent node;
            the second IP address is an IP address of the first IAB node in response to the first IAB node communicating with the CU of the IAB donor through a second parent node;
            the first parent node is a first distributed unit (DU) of the IAB donor, or the first parent node is connected to the CU of the IAB donor through a first DU of the IAB donor; and
            the second parent node is a second DU of the IAB donor, or the second parent node is connected to the CU of the IAB donor through a second DU of the IAB donor; and
        replace the first IP address in user plane downlink tunnel endpoint information of a first interface with the second IP address, wherein:
            the CU of the IAB donor, the first DU of the IAB donor, and the second DU of the IAB donor are function entities of a same IAB donor, and the first interface is an interface between the first IAB node and the CU of the IAB donor; and
        wherein the first IAB node is configured to:
            send the first control plane message to the CU of the IAB donor, wherein the first control plane message includes the first IP address and the second IP address.

2. The communication system according to claim 1, wherein:
    the first control message is an F1 application protocol (F1AP) message.

3. The communication system according to claim 1, wherein the CU of the IAB donor is further configured to:
    hand over the first IAB node from the first parent node to the second parent node.

4. The communication system according to claim 1, wherein the CU of the IAB donor is further configured to:
    send a second control plane message to the first IAB node, wherein:
        the second control plane message includes a third IP address and a fourth IP address, wherein:
            the third IP address is an IP address of the CU of the IAB donor in response to the CU of the IAB donor communicating with the first IAB node through the first parent node, and the fourth IP address is an IP address of the CU of the IAB donor in response to the CU of the LAB donor communicating with the first IAB node through the second parent node; and wherein the first IAB node is configured to:
            receive the second control plane message from the CU of the IAB donor.

5. The communication system according to claim 4, wherein the second control plane message is an F1AP message.

6. An apparatus, comprising:
    at least one processor; and
    a memory coupled to the at least one processor and storing programming instructions for execution by the at least one processor, wherein the programming instructions instruct the at least one processor to perform operations to:
        receive a first control plane message from a first integrated access and backhaul (IAB) node, wherein:
            the first control plane message includes a first internet protocol IP address and a second IP address;
            the first IP address is an IP address of the first IAB node in response to the first IAB node communicating with a centralized unit (CU) CU of an IAB donor through a first parent node;
            the second IP address is an IP address of the first IAB node in response to the first IAB node communicating with the CU of the IAB donor through a second parent node;
            the first parent node is a first distributed unit (DU) of the IAB donor, or the first parent node is connected to the CU of the IAB donor through a first DU of the IAB donor; and
            the second parent node is a second DU of the IAB donor, or the second parent node is connected to the CU of the IAB donor through a second DU of the IAB donor; and
        replace the first IP address in user plane downlink tunnel endpoint information of a first interface with the second IP address, wherein:
            the CU of the IAB donor, the first DU of the IAB donor, and the second DU of the IAB donor are function entities of a same IAB donor, and the first interface is an interface between the first IAB node and the CU of the IAB donor.

7. The apparatus according to claim 6, wherein:
    the first control message is an F1 application protocol (F1AP) message.

8. The apparatus according to claim 6, wherein the instructions further instruct the at least one processor to perform operations to:
    hand over the first IAB node from the first parent node to the second parent node.

9. The apparatus according to claim 6, wherein the instructions further instruct the at least one processor to perform operations to:

send a second control plane message to the first IAB node, wherein:
the second control plane message comprises a third IP address and a fourth IP address, wherein:
the third IP address is an IP address of the CU of the IAB donor in response to the CU of the IAB donor communicating with the first IAB node through the first parent node, and the fourth IP address is an IP address of the CU of the IAB donor in response to the CU of the IAB donor communicating with the first IAB node through the second parent node.

10. The apparatus according to claim 9, wherein the second control plane message is an F1AP message.

11. An apparatus, comprising:
at least one processor; and
a memory coupled to the at least one processor and storing programming instructions for execution by the at least one processor, wherein the programming instructions instruct the at least one processor to perform operations to:
send a first control plane message to a centralized unit (CU) of an integrated access and backhaul (IAB) donor, wherein the first control plane message includes a first Internet Protocol (IP) address and a second IP address, wherein:
the first IP address is an IP address of a first IAB node in response to the first IAB node communicating with the CU of the IAB donor through a first parent node, and the second IP address is an IP address of the first IAB node in response to the first IAB node communicating with the CU of the IAB donor through a second parent node;
the first parent node is a first distributed unit (DU) of the IAB donor, or the first parent node is connected to the CU of the IAB donor through a first DU of the IAB donor;
the second parent node is a second DU of the IAB donor, or the second parent node is connected to the CU of the IAB donor through a second DU of the IAB donor; and
the CU of the IAB donor, the first DU of the IAB donor, and the second DU of the IAB donor are function entities of a same IAB donor.

12. The apparatus according to claim 11, wherein;
the first control message is an F1 application protocol (F1AP) message.

13. The apparatus according to claim 11, wherein the first IAB node is handed over from the first parent node to the second parent node.

14. The apparatus according to claim 11, wherein the programming instructions further instruct the at least one processor to perform operations to:
receive a second control plane message from the CU of the IAB donor, wherein the second control plane message includes a third IP address and a fourth IP address; and
replace the third IP address in user plane uplink tunnel endpoint information of a first interface with the fourth IP address, wherein:
the third IP address is an IP address of the CU of the IAB donor in response to the first IAB node communicating with the CU of the IAB donor through the first parent node, the fourth IP address is an IP address of the CU of the IAB donor in response to when the first IAB node communicating with the CU of the IAB donor through the second parent node, and the first interface is an interface between the first IAB node and the CU of the IAB donor.

15. The apparatus according to claim 14, wherein the second control plane message is an F1AP message.

* * * * *